United States Patent
Beard

(10) Patent No.: US 10,156,627 B2
(45) Date of Patent: Dec. 18, 2018

(54) AIRCRAFT NAVIGATION LIGHT ADS-B RADIO

(71) Applicant: uAvionix Corporation, Bigfork, MT (US)

(72) Inventor: Paul Beard, Bigfork, MT (US)

(73) Assignee: UAVIONIX CORPORATION, Bigfork, MT (US)

(*) Notice: Subject to any disclaimer, the term of this patent is extended or adjusted under 35 U.S.C. 154(b) by 0 days.

(21) Appl. No.: 15/849,327

(22) Filed: Dec. 20, 2017

(65) Prior Publication Data

US 2018/0100914 A1    Apr. 12, 2018

Related U.S. Application Data

(63) Continuation-in-part of application No. 29/625,423, filed on Nov. 9, 2017, and a continuation-in-part of application No. 15/805,336, filed on Nov. 7, 2017, and a continuation-in-part of application No. 15/659,596, filed on Jul. 25, 2017, and a continuation-in-part of application No. 15/290,708, filed on Oct. 11, 2016, now Pat. No. 9,906,265.

(60) Provisional application No. 62/395,900, filed on Sep. 16, 2016, provisional application No. 62/384,007, filed on Sep. 6, 2016, provisional application No. 62/242,082, filed on Oct. 15, 2015, provisional application No. 62/242,182, filed on Oct. 15, 2015, provisional application No. 62/239,016, filed on Oct. 8, 2015.

(51) Int. Cl.
| H04L 27/26 | (2006.01) |
| G01S 5/02 | (2010.01) |
| G01S 5/00 | (2006.01) |
| B64D 47/02 | (2006.01) |

(52) U.S. Cl.
CPC ............ *G01S 5/0226* (2013.01); *B64D 47/02* (2013.01); *G01S 5/0072* (2013.01)

(58) Field of Classification Search
CPC ..... H04L 7/042; H04L 27/2662; G01S 13/91; G01S 13/93; G01S 13/9303; G08G 5/00; G08G 5/065
USPC .............. 375/343, 219; 701/120; 342/29, 36
See application file for complete search history.

(56) References Cited

U.S. PATENT DOCUMENTS

| 2012/0112950 A1* | 5/2012 | Hovey ...................... G08G 5/04 342/29 |
| 2014/0163857 A1* | 6/2014 | Melum .............. H04B 7/18506 701/300 |
| 2016/0349361 A1* | 12/2016 | Schulte ................... G01S 13/74 |

* cited by examiner

*Primary Examiner* — Khai Tran
(74) *Attorney, Agent, or Firm* — Suiter Swantz pc llo

(57) ABSTRACT

The ADS-B radio extracts Mode transponder data from parasitic oscillations on the aircraft power line induced by transmissions of ownship radar transponder reply signals. The radio is configured for replacement installation of an aircraft lighting assembly, and connection thereby to legacy onboard power sources without resorting to wireless or wired radar transponder, or pneumatic connections.

16 Claims, 21 Drawing Sheets

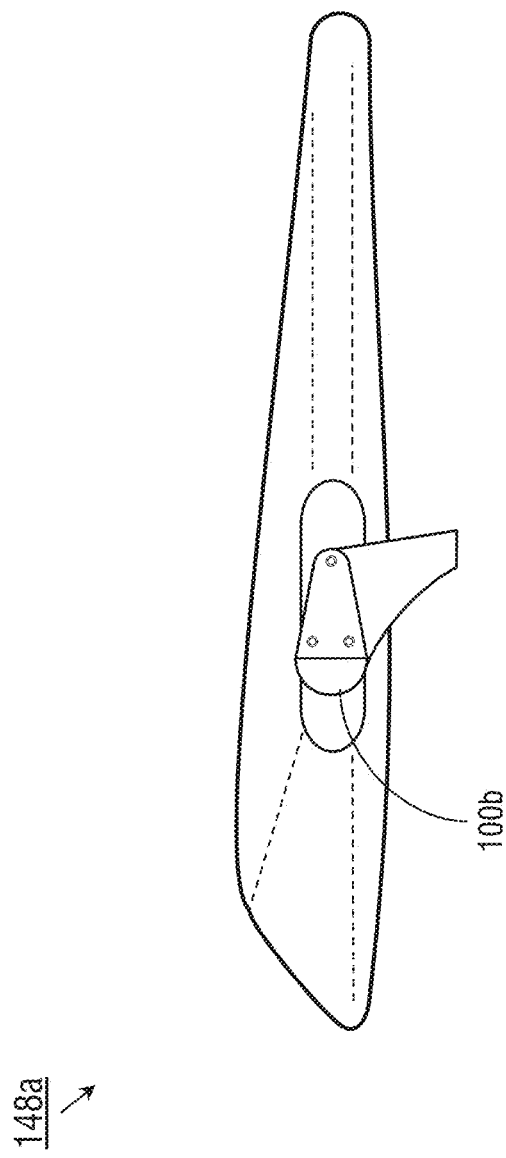

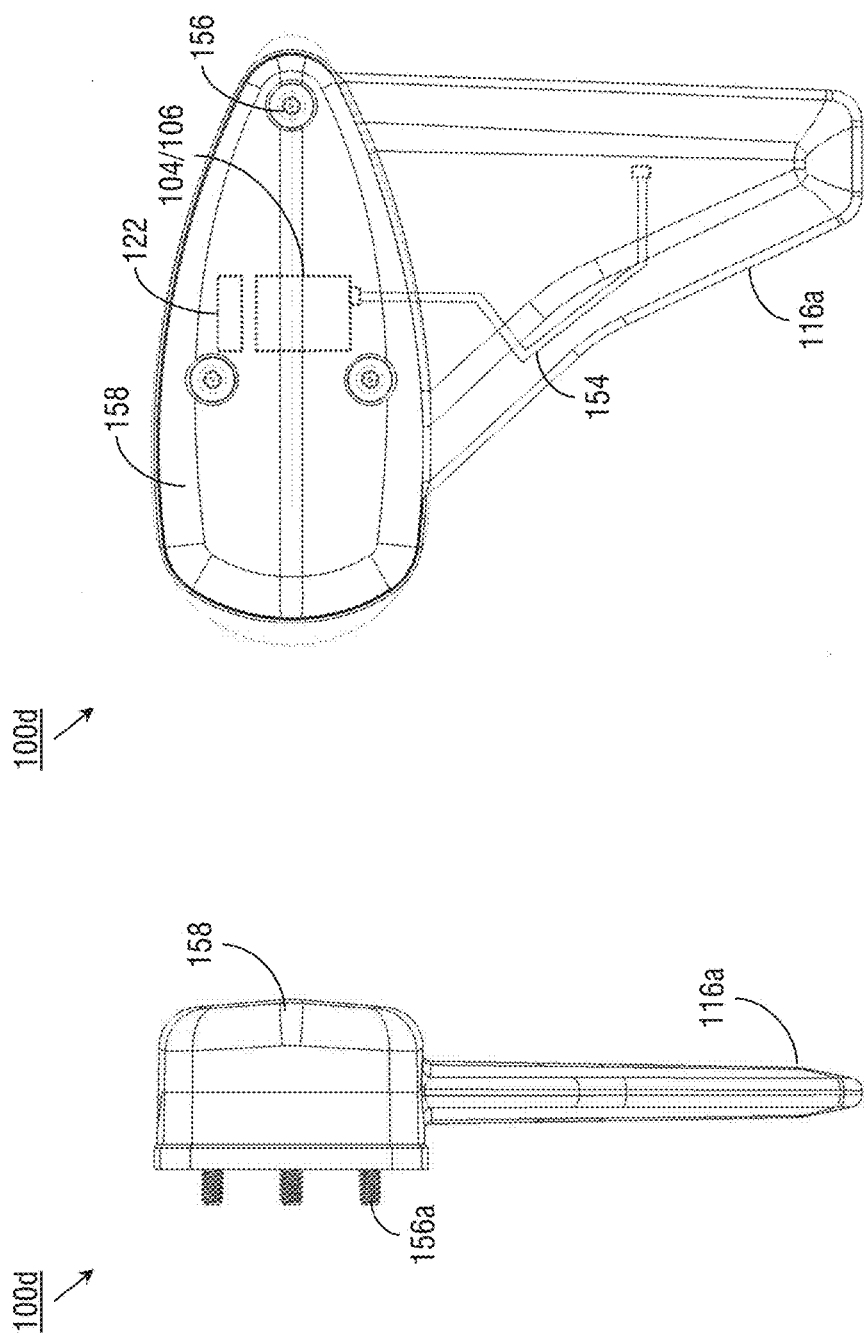

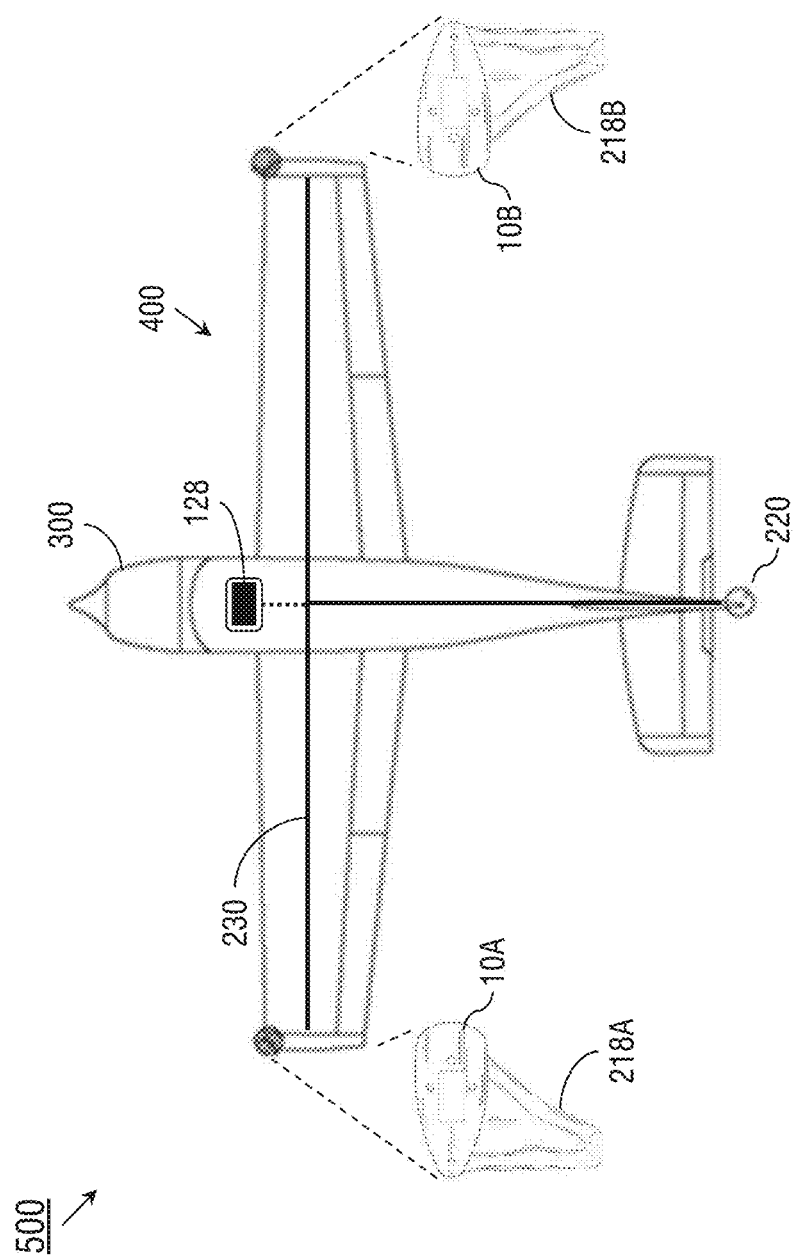

AIRCRAFT NAVIGATION LIGHT ADS-B RADIO

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

United States Design Patent Application entitled POSITION INDICATOR, naming Paul Beard as an inventor, filed Nov. 9, 2017, application Ser. No. 29/625,423;

United States Non-Provisional Patent Application entitled AUTO-CONFIGURABLE WING-MOUNTABLE AUTOMATIC DEPENDENT SURVEILLANCE-BROADCAST (ADS-B) COMPATIBLE TRANSCEIVER, naming Paul Beard as an inventor, filed Nov. 7, 2017, application Ser. No. 15/805,336;

United States Non-Provisional Patent Application entitled WING-MOUNTABLE AUTOMATIC DEPENDENT SURVEILLANCE-BROADCAST (ADS-B) COMPATIBLE TRANSCEIVER, naming Paul Beard as an inventor, filed Jul. 25, 2017, application Ser. No. 15/659,596;

United States Non-Provisional Patent Application entitled MANCHESTER CORRELATOR, naming Paul Beard as an inventor, filed Oct. 11, 2016, application Ser. No. 15/290,708;

United States Provisional Patent Application entitled SYSTEMS AND METHODS FOR LOCATION GUIDANCE OF AN UNMANNED AERIAL SYSTEM (UAS), naming Paul Beard as an inventor, filed Sep. 16, 2016, application Ser. No. 62/395,900;

United States Provisional Patent Application entitled SYSTEMS AND METHODS FOR LOCATION GUIDANCE OF AN UNMANNED AERIAL SYSTEM (UAS), naming Paul Beard as an inventor, filed Sep. 6, 2016, application Ser. No. 62/384,007;

United States Provisional Patent Application entitled MANCHESTER CORRELATOR, naming Paul Beard as an inventor, filed Oct. 15, 2015, application Ser. No. 62/242,082;

United States Provisional Patent Application entitled SYSTEMS AND METHODS FOR LOCATION GUIDANCE OF AN UNMANNED AERIAL SYSTEM (UAS), naming Paul Beard as an inventor, filed Oct. 15, 2015, application Ser. No. 62/242,182; and United States Provisional Patent Application entitled TRANSPONDER ASSISTED DETECTION AND RANGING (TADAR) SYSTEM AND APPARATUS, naming Paul Beard as an inventor, filed Oct. 8, 2015, application Ser. No. 62/239,016.

Said U.S. patent application Ser. Nos. 29/625,423; 15/805,336; 15/659,596; 15/290,708; 62/395,900; 62/384,007; 62/242,082; 62/242,182; and 62/239,016 are herein incorporated by reference in their entirety.

TECHNICAL FIELD

The present invention generally relates to automatic dependent surveillance-broadcast (ADS-B) system, and, in particular, a power line conducted automatic dependent surveillance-broadcast (ADS-B) system.

BACKGROUND

Automatic Dependent Surveillance-Broadcast (ADS-B) is an exemplary alternative surveillance technology in which compliant aircraft determine their positions via satellite navigation (e.g. GPS) and broadcast their positions, along with other relevant data, such that other vehicles and/or ground stations can receive the signals. In this way, the ADS-B system can work in tandem with other aircraft management systems such as collision avoidance systems. In the United States, all aircraft operating in airspace classes A, B, C, and E will be required to be equipped with equipment to transmit ADS-B information in the form of ADS-B OUT signals by 2020. ADS-B OUT refers to the periodic transmission of ownship data (e.g., identifier, position, velocity, altitude) to ground control and other aircraft in the vicinity, while ADS-B IN refers to onboard reception of flight, weather, and traffic updates (e.g., FIS-B, TIS-B) broadcast by ground stations as well as direct communications from proximate aircraft. However, an installation of ADS-B IN and OUT equipment on aircraft requires additional antennas, power supplies, and connections, which is both bulky and expensive. These metrics may put hobbyist level aviators out of reach.

SUMMARY

An ADS-B compliant transmitter for replacing a vehicle light is disclosed. The transmitter is electrically powered by the installed vehicle electrical system and neither pneumatically nor electrically connected to a barometric pressure-sensing device or squawk-code user interface system. Additionally, the transmitter neither requires nor utilizes either a wired signal connection to the output of an ownship radar transponder, or an antenna and receiver for receiving an ownship radar transponder output signal. Preferably, the transmitter has a size and shape at least partially conforming to an external vehicle light to be replaced, and is connected to the vehicle electrical system via a power wire and a ground connection. If the vehicle light being replaced by the ADS-B compliant replacement vehicle light is a position light, then the transmitter also includes either a white, red, or green light emitting device (preferably complying with FAA Advisory Circular AC NO: 20-74, *Aircraft Position and Anti-Collision Light Measurements*, incorporated herein by reference). The transmitter includes a processor for electrical stimulation from the power wire and for reconstructing one or more data based on an induced signal on the power wire, and for preparing an ADS-B transmission including data at least partially including data resolved from induced signals on the power wire. Also included is an antenna operably connected to and generally collocated with the vehicle light.

A power line conducted reply monitor for an automatic dependent surveillance-broadcast (ADS-B) system is disclosed, in accordance with one or more embodiments of the present disclosure. In one embodiment, an aircraft including a radar transponder connected to an aircraft electrical system configured to transmit at least one reply signal in response to a radio-frequency interrogation may be leveraged to provide ADS-B OUT compliant transmissions. In such an embodiment, an ADS-B navigation light electrically coupled to an aircraft electrical system power line may detect at least one induced signal on the aircraft electrical system power line. The induced signal corresponding to the aircraft radar transponder reply signal. The present invention of at least one embodiment may utilize a processor for extracting data from the induced signal for inclusion in an ADS-B transmittal.

A power line conducted automatic dependent surveillance-broadcast (ADS-B) system is disclosed, in accordance with one or more embodiments of the present disclosure. In one embodiment, the system includes a transponder configured to induce a parasitic oscillation on an aircraft power system in response to a radio-frequency interrogation. In another embodiment, the system includes a band-pass filter operatively coupled to the transponder. In another embodiment, the system includes a power detector operatively coupled to the band-pass filter. In another embodiment, the system includes a universal access transceiver (UAT) operatively coupled to the power detector. In another embodiment, the system includes a processor operatively coupled to the universal access transceiver and the power detector, wherein the processor is configured to receive the parasitic oscillation from the aircraft power system; reconstruct one or more data extracted from the parasitic oscillation; and transmit the one or more data to the universal access transceiver (UAT).

A power line conducted reply monitor for an automated dependent surveillance-broadcast (ADS-B) system is disclosed, in accordance with one or more embodiments of the present disclosure. In one embodiment, the system includes a transponder configured to transmit at least one reply signal in response to a radio frequency (RF) interrogation, the transponder coupled to a power line associated with an aircraft. In another embodiment, the system includes the ADS-B system coupled to a processor operatively coupled to the power line and to the transmitter (or in some embodiments a transceiver). In another embodiment, the system includes the processor configured to detect parasitic oscillations on the power line produced by reply transmissions of the aircraft radar transponder. Data from the parasitic oscillation corresponding to the reply signal may be extracted and included in an ADS-B transmission.

An aircraft-based automatic dependent surveillance-broadcast (ADS-B) system is disclosed, in accordance with one or more embodiments of the present disclosure. In one embodiment, the system includes a transponder configured to transmit at least one reply signal in response to a radio frequency (RF) interrogation, the transponder coupled to a power line associated with an aircraft. In another embodiment, the system includes at least one filter coupled to the power line and configured to filter an induced signal on the power line, the induced signal corresponding to the reply signal. In another embodiment, the system includes at least one power detector coupled to the filter and configured to generate digital output based on the filtered induced signal. In another embodiment, the system includes at least one processor coupled to the power detector and configured to: extract configuration data from the digital output, the configuration data corresponding to the aircraft; and forward the extracted configuration data to at least one of a memory and a transceiver of the ADS-B system.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 9A through 9E are illustrations of a wing-mountable transceiver device incorporating a navigation lighting assembly;

FIGS. 10A and 10B are illustrations of the wing-mountable transceiver device of FIG. 4;

FIG. 15 a diagrammatic illustration of an induced electrical power line communication system incorporating the wing-mountable transceiver devices of FIGS. 1-3.

DETAILED DESCRIPTION

Figure 1:
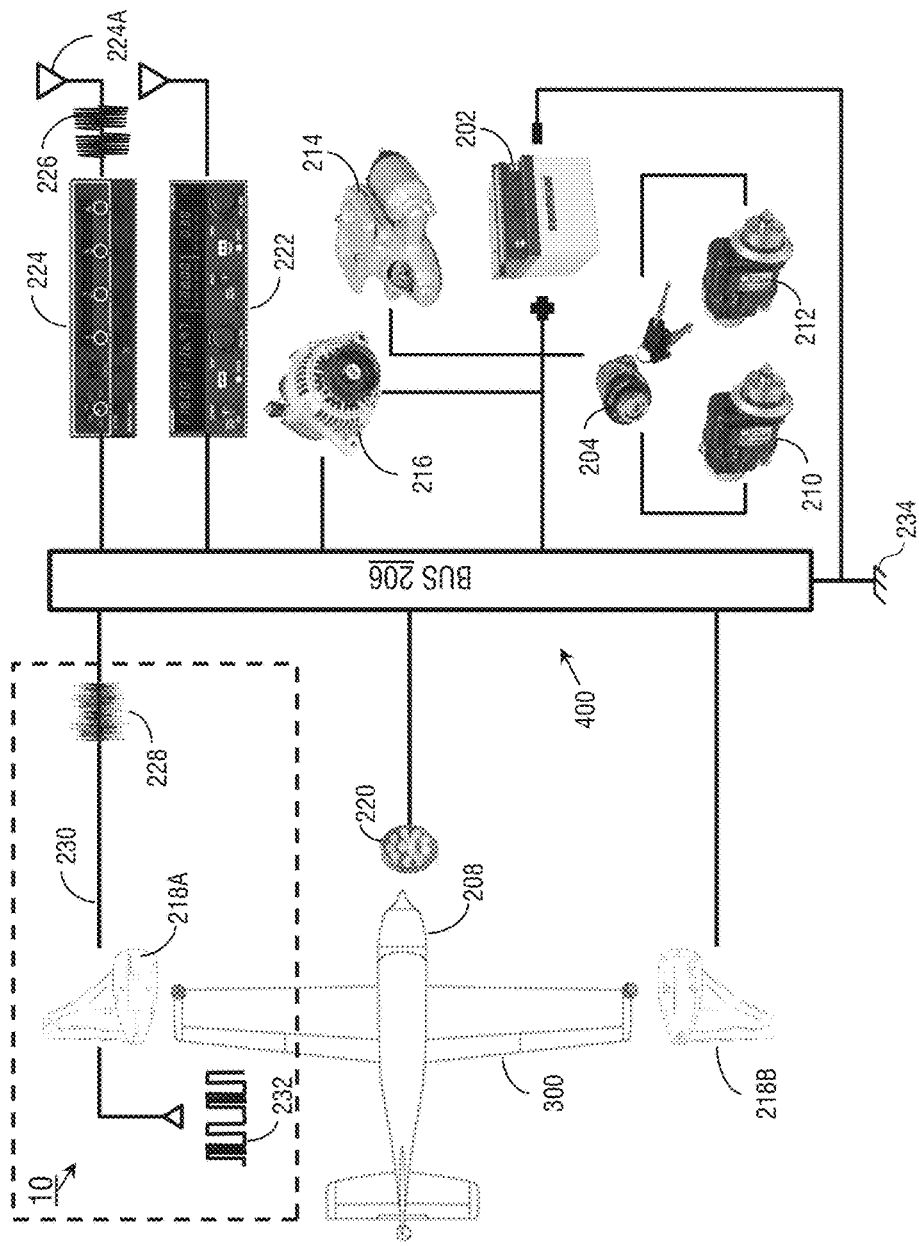
FIG. 1 illustrates a highly diagrammatic scheme of an electrical system for a simple aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

An ADS-B compliant transmitter for replacing a vehicle light (14 CFR §§ 91.225 and 91.227; FAA AC 20-165B and AC 20-172B; and FAA TSO-C154c and TSO-C166b, all incorporated herein by reference) is disclosed. Broadly speaking, embodiments of the inventive concepts disclosed herein are directed to a micro-scale transceiver device capable of bringing ADS-B connectivity to experimental and light-sport aircraft classes. The transceiver device may incorporate either or both of a UAT (978 MHz) transmitter and/or an extended squitter dual-mode (1090 MHz) receiver providing at least ADS-B OUT but may preferably include both ADS-B OUT and ADS-B IN capability. Additionally, also included in a presently preferred embodiment, an integrated Wi-Fi interface (and/or BLUETOOTH® or the like wireless data link) for sending at least decoded ADS-B information to onboard mobile devices and/or electronic flight bag (EFB) applications. The transceiver device may be configured for installation in a wing-mounted navigation light housing, and for connection thereby to legacy power and antenna systems. The transceiver device thereby ensures ADS-B compliance, as well as the situational awareness benefits of two-way ADS-B service, for small-scale and hobbyist craft with minimal detriment to cost, power, weight, and aerodynamic concerns.

FIG. 1 is a highly diagrammatic schematic of an electrical system 400 for a simple aircraft 300. The present invention 10 may be included as is shown in FIG. 1. Such a simple aircraft electrical system 400 may include a battery 202, and a keyed switch 204 for energizing the electrical system 400 via the electrical system bus 206. The aircraft engine 208 may include an ignition system incorporating magnetos (210, 212), a starter 214, and an alternator 216. Bus 206 may provide electrical power (preferably via circuit breakers, not shown) to aircraft accessories and components such as navigation lights (218A, 218B) and landing light 220. Radio frequency (RF) communication with air traffic control (ATC), air-to-air and air-to-ground communication, and navigation may be provided via a NAV/COM transceiver 222. A radar transponder 224 may provide a pilot-entered and generally ATC-provided squawk code and IDENT (Mode 3/A), optional barometric altitude (Mode-C), and optional aircraft identification (Mode S) information via a response signal 226 (e.g. reply signal, output signal) transmitted by the transponder via transponder antenna 224A. The response signal 226 may be transmitted by the transponder 224 at 1090 MHz in response to a radar interrogation 236 (FIG. 3A) received at 1030 MHz (via the transponder antenna 224A, e.g., from proximate aircraft, traffic collision avoidance systems (TCAS), or ATC); for example, the output of Mode-C transponders is approximately 200 W. The transmission of the response signal 226 by the transponder 224 may induce a noise signal 228 (e.g., current pulse) in the aircraft's electrical system 400 (including power wire 230) for an embodiment of the instant invention, navigation position reporting ADS-B beacon (10), e.g., incorporated in a navigation light 218A, 218B. The ADS-B beacon 10 may monitor the power wire 230, detecting the noise signal 228 and extracting the transponder reply information from the noise signal 228. The ADS-B beacon 10 may periodically transmit (e.g., via an ADS-B compatible transmitter incorporated therein, such as a Universal Access Transceiver (UAT) transmitting at 978 MHz or an extended squitter (ES) transmitting at 1090 MHz) ADS-B signals 232 (e.g., ADS-B OUT messages, packets having an ADS-B compatible format) incorporating at least some of the transponder reply information (Mode-A, Mode-C, or Mode-S, and the like) extracted from the noise signal 228 on the power line 230.

In operation, the invention 10, in the embodiment illustrated in FIG. 1, provides a robust and economical ADS-B OUT solution for small aircraft and the like. For example, an aircraft operator using the embodiment of the invention 10 of FIG. 1 may install ADS-B features without drilling holes or adding additional antennas and may avoid cost and drag penalties associated with such installations. For example (related, but not capable of providing the full feature set of embodiments of the present invention), U.S. Pat. No. 8,102, 301 teaches the use of an ADS-B transmitter for transmitting an ADS-B signal, the transmitter including a receiver for receiving transmissions wirelessly from an onboard radar transponder. Both personal and commercial aircraft need traffic avoidance and separation assurance most in traffic-dense airspace, such as that found around airports. Additionally, an aircraft is most likely to incur upon the airspace envelope of those aircraft nearest to it. Other aircraft proximate to airports, whether operating on the ground or in the air, continuously broadcast Mode-A, Mode-C, and/or Mode-S (or the like) radar transponder data. The ADS-B radar transponder receiver of the U.S. Pat. No. 8,102,301 patent cannot discriminate ownship radar transponder transmissions (i.e., those transmissions originating from its own aircraft) from radar transponder transmissions broadcast by nearby aircraft. Further, U.S. Pat. No. 9,720,079 teaches the use of an ADS-B transmitter (for transmitting an ADS-B signal) including a coaxially-wired connection to the antenna output from an onboard radar transponder. While the direct-wired link disclosed by the U.S. Pat. No. 9,720,079 patent to an ownship radar transponder does not require a receiver for receiving ownship radar transponder RF transmissions, the coaxial direct-wired link does require aircraft airframe modification (antenna or otherwise) in order to provide ADS-B OUT transmissions.

Figure 2:
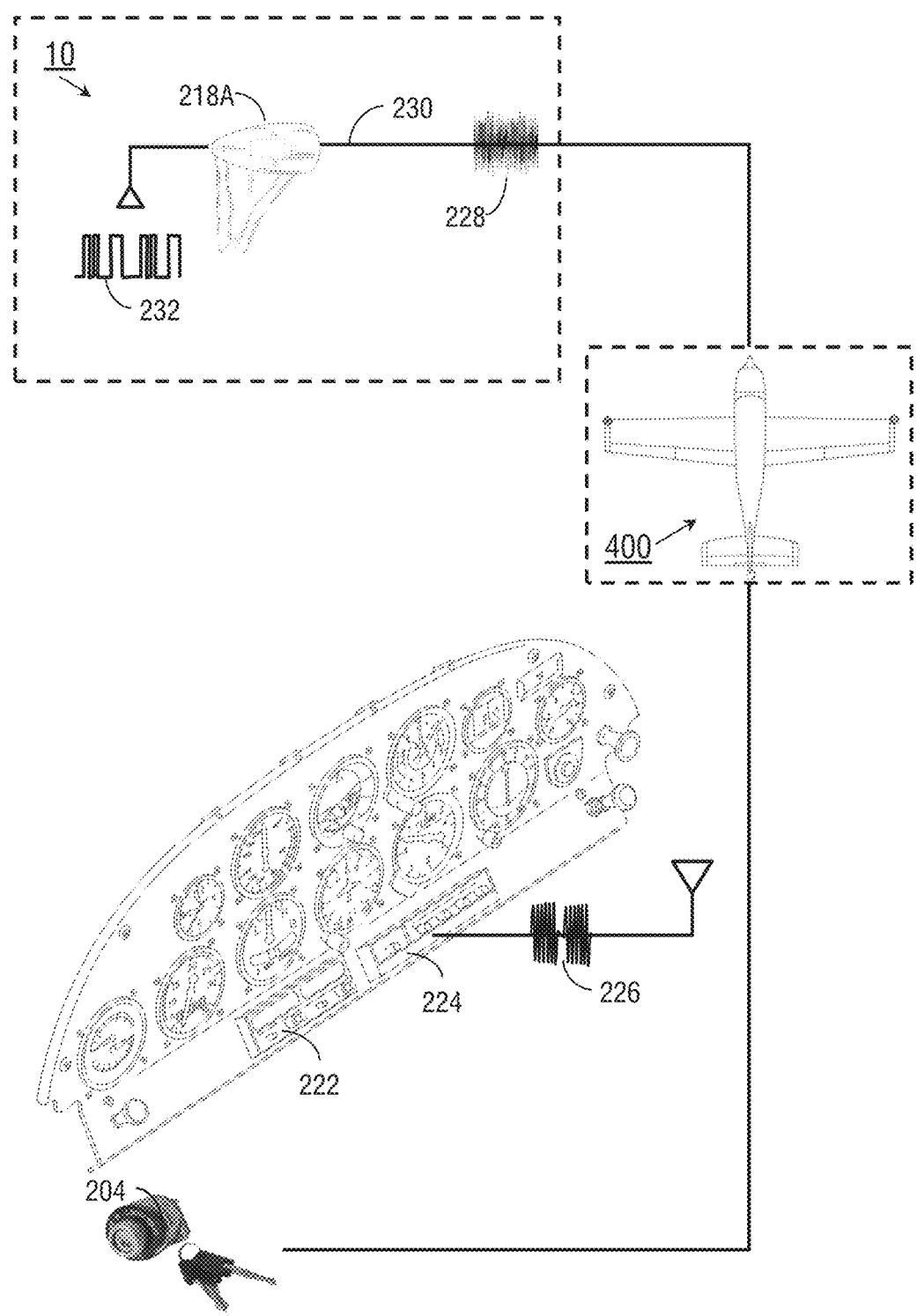
FIG. 2 illustrates the invention replacing a navigation light of an aircraft according to the inventive concepts disclosed herein.

FIG. 2 illustrates the invention 10 replacing a navigation light 218A of an aircraft 300 wherein the invention 10 has no wired or wireless connection to the transponder 224 output of an aircraft 300. The invention 10 is electrically connected to the electrical system 400 of the aircraft 300 identically to the navigational light 218 (A or B) it replaced, i.e., via the power wire 230 and ground 234 (FIG. 1). The invention 10 does not require a wireless or wired datalink by which the response signal 226 of the transponder 224 would be received.

Figure 3A:
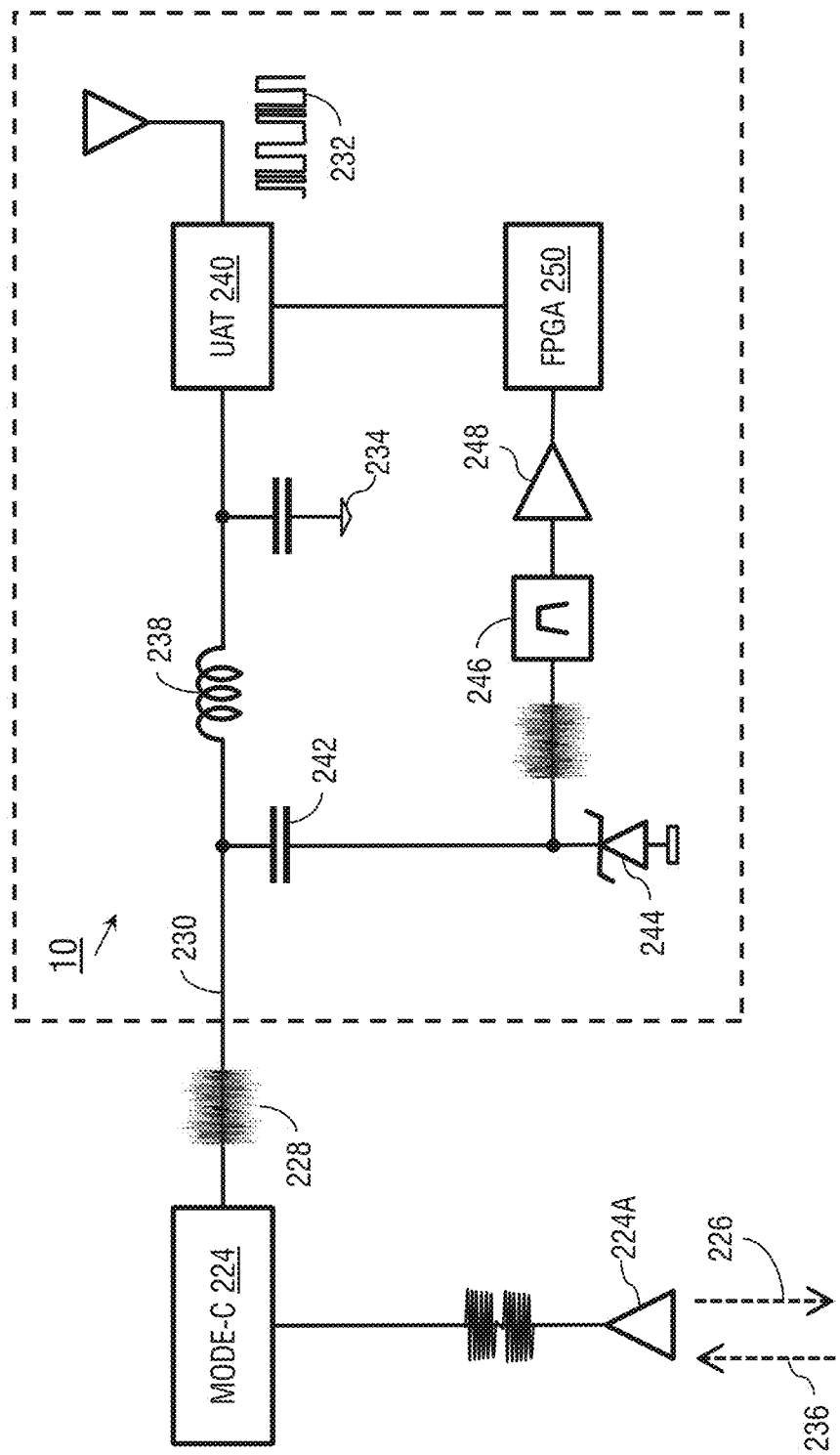
FIG. 3A illustrates a detailed circuit diagram of a system with a transponder and ADS-B unit according to the inventive concepts disclosed herein.

Now referring to FIG. 3A, FIG. 3A illustrates a detailed circuit diagram of a system with a transponder and ADS-B unit, in accordance with one or more embodiments of the present disclosure. In one embodiment, an aircraft 300 is equipped with a transponder 224 to assist in identifying aircraft on air traffic control radar. For example, the transponder 224 may be configured to transmit a response signal 226 containing aircraft information in response to a receipt of a radio-frequency interrogation 236 from other aircraft, air traffic control, or the like. Further, the aircraft 300 may include an ADS-B unit 10 operatively coupled to the transponder 224. For example, the ADS-B unit 10 may be coupled to the transponder 224 through a power wire 230. Additionally, induced signal 228 may be generated within the power wire 230 of the aircraft 300. For example, the induced signal 228 may be generated from the transponder 224 when the transponder 224 receives a radio-frequency interrogation 236 from air traffic control (ATC) stations, other aircraft, or the like and transmits a response signal 226 in response to the radio-frequency interrogation 236. For instance, the induced signal 228 within the power wire 230, under certain conditions may include the same information as the response signal 226 and the radio-frequency interrogation 236. In another instance, the response signal 226 transmitted by the transponder 224 of the aircraft 300 may include a Mode-A, a Mode-C, or a Mode-S response signal. It is noted that the induced signal 228 containing the same information as the response signal 226 and/or the radio-frequency interrogation 236 may be required to further be processed (e.g., filtering, reconstructing, or the like) in order to form usable information.

In one embodiment, the ADS-B unit 10 may include a choke 238 coupled to the power wire 230 to block higher-frequency alternating current (AC) from transmitting to a universal access transceiver (UAT) 240 within the ADS-B unit 10. For example, the choke 238 utilized with the embodiments of the present disclosure may include a radio-frequency choke (RFC), which blocks radio-frequencies while allows audio and direct current (DC) to pass. In this regard, the choke 228 may be disposed on the power wire 230 between the transponder 224 and the UAT 240 to provide DC to the UAT 240. The choke 238 may isolate the UAT by minimizing the effect of the input capacitors on the induced signal 228 on the power wire 230.

In one embodiment, the ADS-B unit 10 may include a capacitor 242 to block DC in the induced signal 228 on the power wire 230 from flowing further. It is noted that variety of capacitors may be utilized to achieve the same result and the materials used for the capacitor 242 may include, but not be limited to, glass, ceramic, plastic film, paper, mica, oxide layers, or the like. The capacitor 242 may be disposed on the power wire 230 branched off from the power wire 230 which is equipped with the choker 238.

In one embodiment, the ADS-B unit 10 may include a Zener diode 244 to generate low stabilized power supply from a higher voltage so that the Zener diode 244 protects the circuits from over-voltage. In this regard, Zener diode 244 is used to regulate the voltage in the circuits. The Zener diode 244 may be disposed on the power wire 230 past the capacitor 242.

In one embodiment, the ADS-B unit 10 may include a bandpass filter 246 to pass frequencies within a certain range and reject frequencies outside that range. The bandpass filter 246 may allow the induced signal 228 within a selected range of frequencies to be reconstructed, while preventing the induced signal 228 at unwanted frequencies from getting through. The bandpass filter 246 may also optimize the signal-to-noise ratio. The bandpass filter 246 may be disposed on the power wire 230 past the Zener diode 244.

In one embodiment, the ADS-B unit 10 may include a power detector 248 to measure the induced signal 228 on the power wire 230. The power detector 248 may be disposed on the power wire 230 past the bandpass filter 246.

In one embodiment, the ADS-B unit 10 of the aircraft 300 may include a processing system 250 to receive the induced signal 228 on the power wire 230 transmitted from the transponder 224. For example, the processing system 250 of the ADS-B unit 10 may include, but not limited to, a field-programmable gate array (FPGA) or an application specific integrated circuit (ASIC). Additionally, the processing system 250 is reconstructing the Mode-A or Mode-C replies, which are then shared with the transmitter (UAT or the like) 240 for transmission as UAT or the like. In operation the processor 250 may not necessarily generate the ADS-B signal 232. It may reconstruct an ADS-B readable reply 232 by decoding the induced signal 228, which is filtered through, for example, a bandpass filter 246, and then transmitted the ADS-B readable reply 232 to the transmitter (UAT) 240. In this regard, the information reconstructed from the induced signal 228 which is generated from the transponder 224 of the aircraft 300 may be broadcast by the ADS-B unit 10 over the ADS-B datalink to air traffic control stations, other aircraft, or the like without an installation of a dedicated receiver for the ADS-B unit 10 or a dedicated flight crew controls.

In some embodiments, the processing system 250 of the ADS-B unit 10 may reconstruct information that may be used by the universal access transceiver (UAT) from the induced signal 228 on the power wire 230. For example, such information may include assigned Mode 3/A "squawk" code for the aircraft 300, IDENT indication for the aircraft 300, the aircraft altitude, and the like. In this regard, the information reconstructed from the induced signal 228 generated from the transponder 224 of the aircraft 300 may be broadcast by the ADS-B unit 10 over the ADS-B datalink to air traffic control stations, other aircraft, or the like without an installation of a dedicated receiver for the ADS-B unit 10 or a dedicated flight crew controls. This saves weight and reduces cost.

In one embodiment, the ADS-B unit 10 of the aircraft 300 may include a universal access transceiver (UAT) 240 operatively coupled to the processing system 250. A universal access transceiver is a data link approved by the Federal Aviation Administration (FAA) to support not only ADS-B, but also flight information service-broadcast (FIS-B), traffic information service-broadcast (TIS-B), and the like. For example, the UAT 240 may include ADS-B IN and ADS-B OUT capabilities to receive and transmit information to air traffic control stations, other aircraft, or the like. The UAT allows aircraft equipped with "out" broadcast capabilities to be seen by any other aircraft using ADS-B IN capability as well as air traffic control stations. Aircraft equipped with ADS-B IN capability are able to see detailed altitude and vector information from other ADS-B OUT equipped aircraft as well as FIS-B and TIS-B broadcasts. Also, the FIS-B broadcast allows receiving aircraft to view weather and flight service information including Airmen's Meteorological Information (AIRMET), Significant Meteorological Information (SIGMET), national Next Generation Radar (NEXRAD), regional NEXRAD, Notice to Airmen (NOTAM), Pilot Report (PIREP), special use airspace status, terminal area forecasts, amended terminal aerodrome forecasts (TAFs), winds and temperature aloft.

In some embodiments, the UAT 240 may include ADS-B IN capability to receive information from air traffic control stations, other aircraft, or the like over the ADS-B datalink. The UAT 240 may also receive the ADS-B readable reply 232 from the processing system 250 which is reconstructed from the induced signal 228 generated from the transponder 224 of the aircraft 300. Further, the ADS-B unit 10 may be equipped with the ADS-B IN capability to provide operators (e.g., pilots or crews) with weather and traffic information. The ADS-B IN capability of the ADS-B unit 10 may allow for the information directly delivered to a cockpit display. For example, The ADS-B IN capability may provide the operators with an access to a graphical weather displays in the cockpit as well as text-based advisories including notices to airmen, significant weather activity, or the like.

In some embodiments, the UAT 240 may include ADS-B OUT capability to transmit information to air traffic control stations, other aircraft, or the like over the ADS-B datalink. The UAT 240 may also transmit the ADS-B readable reply 232 from the processing system 250 to air traffic control stations, other aircraft, or the like over the ADS-B datalink. Further, the ADS-B unit 10 may be equipped with an ADS-B OUT capability to broadcast information regarding the aircraft 300 to air traffic controls, other aircraft, or the like once per second. For example, the information about the aircraft 300 may include the aircraft's GPS location, barometric altitude, geometric altitude, ground speed, or the like. Air traffic controllers and an aircraft equipped with the ADS-B IN capability may immediately receive the information. In this sense, the ADS-B unit 10 may offer more precise tracking of aircraft compared to radar technology, which typically sweeps for aircraft position information every 5 to 12 seconds. It is also noted that the ADS-B unit 10 allows for providing a better visibility regardless of the terrain or other obstacles, since the ADS-B ground stations are smaller, adaptable than radar towers, and can be placed in locations not possible with radar whereas radio waves from radar are limited to line of site.

It is noted that the induced signal 228 on the power wire 230 is generated due to feedback from the transponder 224 of the aircraft 300 when the transponder 224 of the aircraft 300 receives a radio-frequency interrogation 236 from air traffic control stations, other aircraft, or the like and transmits a response signal 226 in response to the radio-frequency interrogation 236. In this regard, the induced signal 228 on the power wire 230 is generated from the ownship transponder 224 and carries information contained in the radio-frequency interrogation 236 received and the response signal 226 transmitted by the ownship transponder 224. The ADS-B readable reply 232 is reconstructed by the processing system 250 based on the induced signal 228 on the power wire 230 which is generated from the ownship transponder 224. Therefore, embodiments of the present disclosure may allow for mitigating the issue of picking up ADS-B readable replies from neighboring aircraft. This is especially beneficial when the aircraft is in traffic-dense airspace such as airports, which may further enhance safety.

Figure 3B:
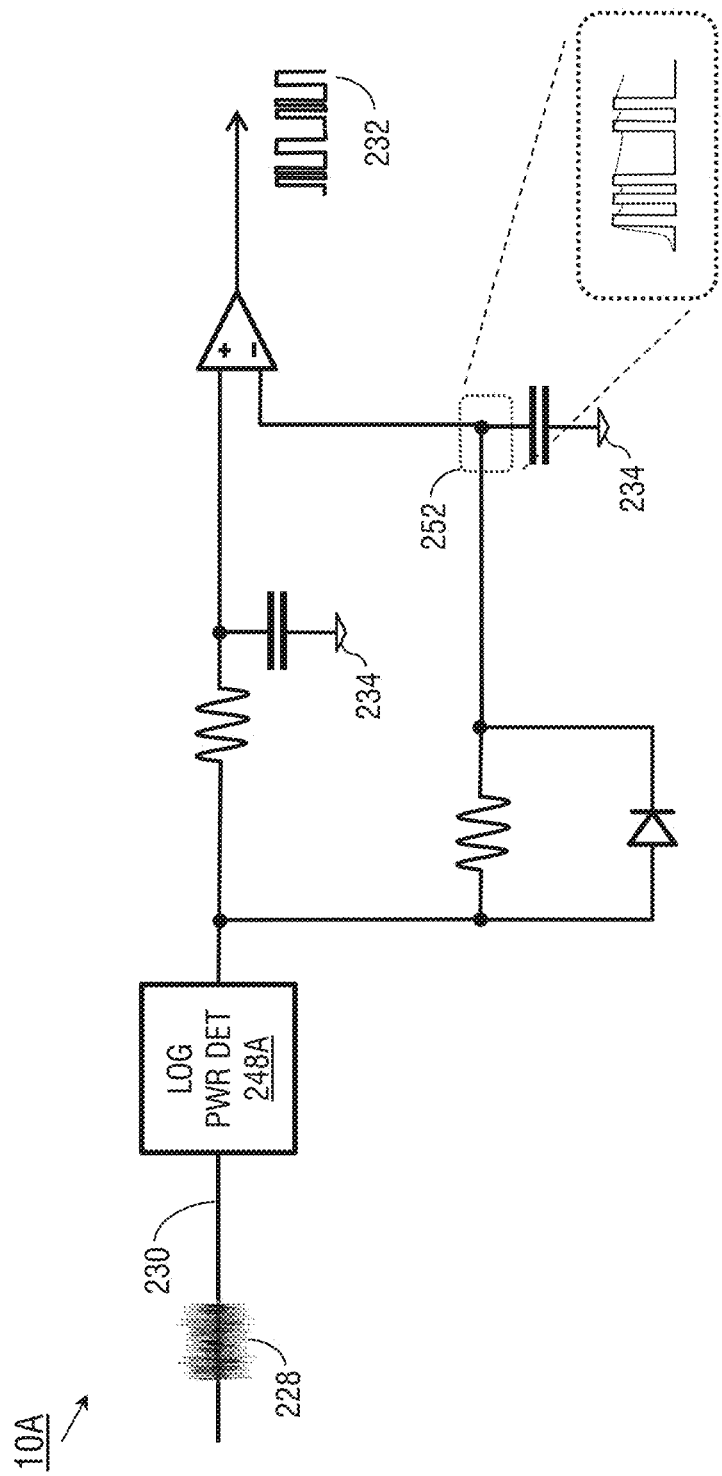
FIG. 3B is a detailed illustration of the circuit of FIG. 3A.

Referring to FIG. 3B, the ADS-B unit 10A may be implemented and may function similarly to the ADS-B unit 10 of FIG. 3A, except that the ADS-B unit 10A may include a detailed adaptive induced signal/decoding circuit for automatically adapting to aircraft type, placement, and electrical load, in accordance with one or more embodiments of the present disclosure. For example, the ADS-B unit 10A may (via the adaptive induced signal/decoding circuit) output a stable digital output 232 (e.g., ADS-B readable reply, or ADS-B signal) by decoding signal inputs 228 (e.g., induced signal, parasitic oscillation, induced pulse, current pulse) on the power wire 230 (for example, the signal inputs 228 are "induced" in that they are a product of the transmission of the reply signal 226 by the transponder 224). Signal inputs 228 flowing through the ADS-B unit 10A may differ significantly based on a number of reasons. For example, the signal inputs 228 flowing through the ADS-B unit 10A may differ based on aircraft sizes (e.g., a turboprop, a business jet, a narrow body, a wide body, or the like) and aircraft types (e.g., commercial, military, experimental, prototype, or the like). By way of another example, the signal inputs 228 flowing through the ADS-B unit 10A may differ based on an installation site of the ADS-B unit 10A on an aircraft. The ADS-B unit 10A may be mounted on various sites (e.g., wings, tail, or the like) on the aircraft (e.g., based on the position of a navigation light 218A/B, 220 (FIG. 1)) and based on the location of the ADS-B unit 10A, strengths of the signal inputs may differ as well. By way of yet another example, the signal inputs 228 flowing through the ADS-B unit 10A may differ based on altitudes of the aircraft. Further, the signal inputs 228 flowing through the ADS-B unit 10A may differ based on the electrical load of the aircraft. Depending on the type and size of the aircraft, the electronic configuration of the aircraft may vary significantly, which translates to a variety of dynamic ranges for the signal inputs 228.

In some embodiments, the ADS-B unit 10A (e.g., the detailed adaptive signal/decoding circuit thereof) may include a logarithmic power detector 248A (i.e., a logarithmic amplifier, a log amp, or a log detector) to provide stable outputs 232. In general, the log detector 248A may have a high dynamic range (e.g., some log power detectors may reach 160 dB of dynamic range or higher) and provide good temperature stability over a wide dynamic range, which is an important factor for an aircraft flying through a variety of temperatures pursuant to its flightpath. Further, the ADS-B unit 10A may include a peak detector to output a DC voltage 252 equal to the peak value of the applied AC signal (e.g., the signal input 228). For example, a sample of the DC voltage 252 obtained by the peak detector of the adaptive induced signal/decoding circuit of the ADS-B unit 10A is depicted in FIG. 3B. It is noted that embodiments of the present disclosure may allow for installing the adaptive induced signal/decoding circuit on various sites within the ADS-B unit 10A to provide stable outputs 232.

Figure 4:
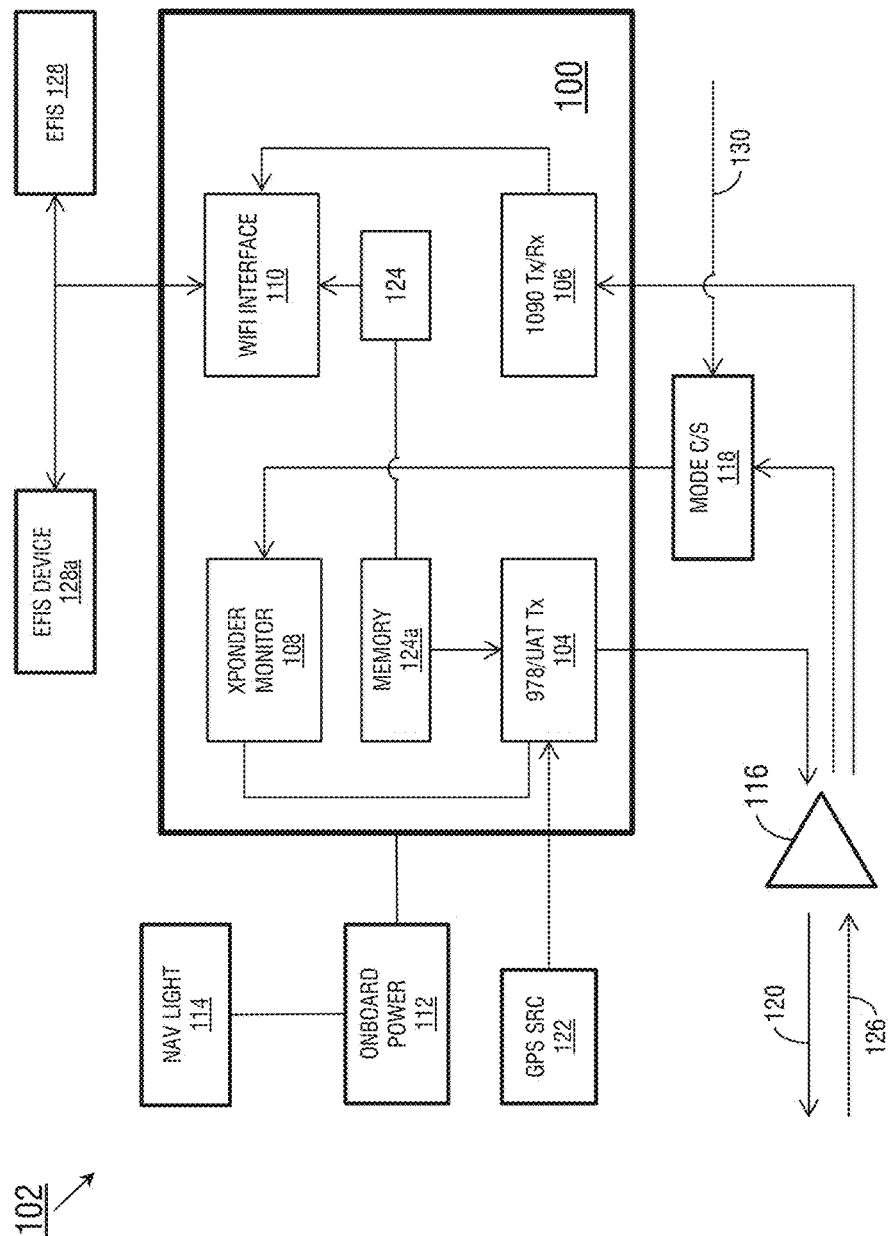
FIG. 4 is a diagrammatic illustration of an exemplary embodiment of a transceiver device according to the inventive concepts disclosed herein.

Referring in particular to FIG. 4, an exemplary embodiment of a transceiver device 100 according to the inventive concepts disclosed herein may be installable aboard an aircraft 102 and may include a 978 MHz Universal Access Transceiver (UAT) transmitter 104, a dual-mode 1090 MHz/

UAT (978 MHz) receiver 106, a transponder monitor 108, and a Wi-Fi interface 110. For example, the transceiver device 100 may be installed aboard the aircraft 102; e.g., within a wing-mounted navigation light housing (as explained in greater detail below) and connected to onboard power sources (112) supplying power to the co-located navigation lights 114 (e.g., LED units). Similarly, the transceiver device 100 may be installed aboard the aircraft in such a way as to connect to, and make use of, an aircraft antenna element (116) such as a legacy transponder antenna used by, e.g., legacy Mode-C and 1090 MHz/Mode-S transponders (118) aboard the aircraft 102.

For example, the UAT transmitter 104 may perform ADS-B OUT functions by periodically broadcasting, to ground control stations and/or any proximate aircraft within range, ADS-B OUT messages (120) comprising position data of the aircraft 102 encoded for transmission by the circuitry and/or processors (124) of the UAT transmitter 104. For example, ADS-B OUT messages 120 may include an encoded aircraft identifier (e.g., ICAO address or tail number) and a position, velocity, and altitude of the aircraft. The position may be a geo-referenced position determined by an ADS-B compatible GPS source (122) or like satellite-based navigational sensor. The transceiver device 100 may include a memory 124*a* or similar data storage unit configured for storing pre-programmed configuration data of the transceiver device 100 for transmission via the UAT transmitter 104. For example, the transceiver device 100 may incorporate an installation or configuration mode via which pre-programmed configuration parameters may be set, e.g., the tail number, ICAO address, or callsign of the aircraft 102; the emitter category corresponding to the aircraft category of the aircraft 102 (e.g., light/rotorcraft, small/glider, ultralight, dirigible, UAV, spacecraft); a default VFR squawk code; an ADS-B IN status (e.g., none, UAT/978 only, 1090/ES only, both), a VSO speed, a flightplan identifier, or size information of the aircraft 102 (e.g., approximate length and width).

Similarly, the dual-mode receiver 106 may receive ADS-B IN messages (126) transmitted at 978 MHz by UAT transmitters at ground control stations or onboard other proximate aircraft and vehicles. ADS-B IN messages (126) may include periodic ADS-B OUT messages transmitted by proximate aircraft and received directly by the dual-mode receiver 106 (e.g., if the aircraft 102 is within range) as well as Traffic Information Service-Broadcast (TIS-B), Flight Information Service-Broadcast (FIS-B), and Automatic Dependent Surveillance-Rebroadcast (ADS-R) messages transmitted by ground control stations. ADS-R messages, for example, may include ADS-B OUT positioning messages transmitted by other aircraft and relayed to the aircraft 102 by the ground control stations. Accordingly, the aircraft 102 may track (via the decoded position data) proximate aircraft that are neither within visual range nor within range of direct ADS-B messaging, but which may soon incur upon the airspace or flightplan of the aircraft 102. The received ADS-B IN messages (126) may be decoded into position data of the proximate aircraft, weather data (e.g., periodic weather reports (Airmen's Meteorological Information (AIRMET) and Significant Meteorological Information (SIGMET)), Meteorological Terminal Aviation Routine (METAR) weather data, Terminal Area Forecasts (TAF), localized weather radar (NEXRAD), and other weather alerts and advisories) or flight and traffic information (e.g., Temporary Flight Restrictions (TFR), Notices to Airmen (NOTAM), and other traffic reports and advisories from nearby airports and ground control facilities), which may be transmitted by the Wi-Fi interface 110 to electronic flight information systems (EFIS) 128 aboard the aircraft. Onboard EFIS 128 may include standards-compliant electronic flight bag (EFB) applications executing on portable communications and computing devices (128*a*), e.g., tablets and smartphones.

The dual-mode receiver 106 may receive ADS-B IN messages (126) from proximate aircraft equipped with 1090 MHz extended squitter (ES) transmitters. The transceiver device 100 may correlate decoded ADS-B IN messages (126) received at 978 MHz and 1090 MHz to provide (via decoded flight data transmitted to onboard EFIS 128) optimal situational awareness via a comprehensive view of proximate aircraft and other traffic. The wireless transponder monitor 108 may listen for, and decode, codes and messages (130) transmitted by legacy Mode-C and Mode-S transponders (e.g., squawk, altitude, IDENT) for integration of the transmitting aircraft with inbound ADS-B IN messages (126) and the resulting decoded position and traffic data.

Figure 5A:
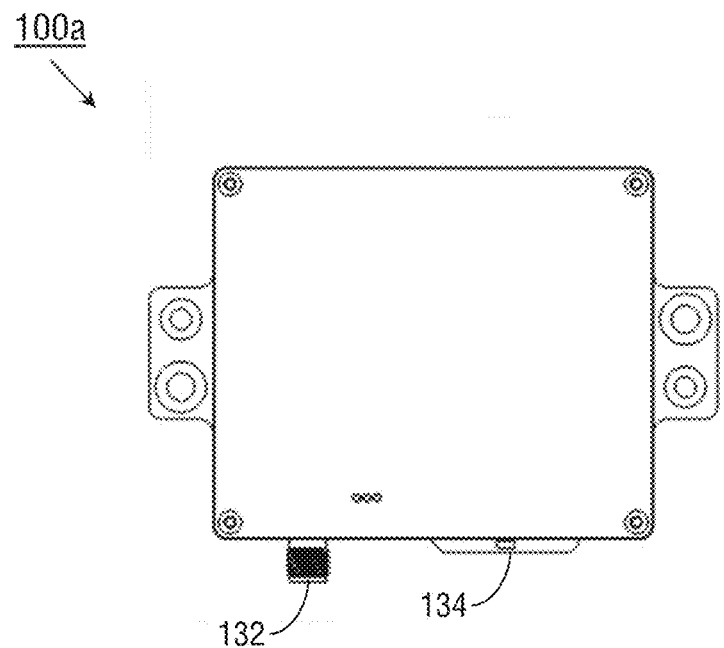
FIGS. 5A and 5B are illustrations of the transceiver device of FIG. 4.
Figure 5B:
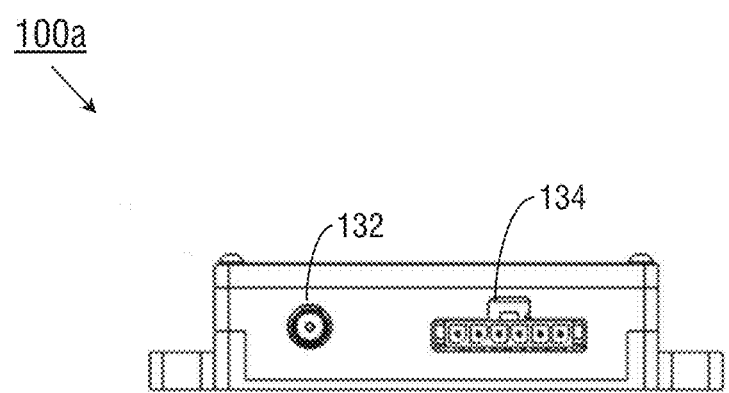

Referring to FIGS. 5A and 5B, the transceiver device 100*a* may be implemented and may operate similarly to the transceiver device 100 of FIG. 4, except that the transceiver device 100*a* may include an exterior cable port 132 for connecting the transceiver device (via cable) to a legacy antenna (116, FIG. 4) or other external antenna, and one or more communications ports 134 for connecting the transceiver device to the GPS source (122, FIG. 4) or other components. In one embodiment, the transceiver device 100*a* measures approximately 65 mm×55 mm×20 mm and weighs approximately 60 g.

Figure 6:
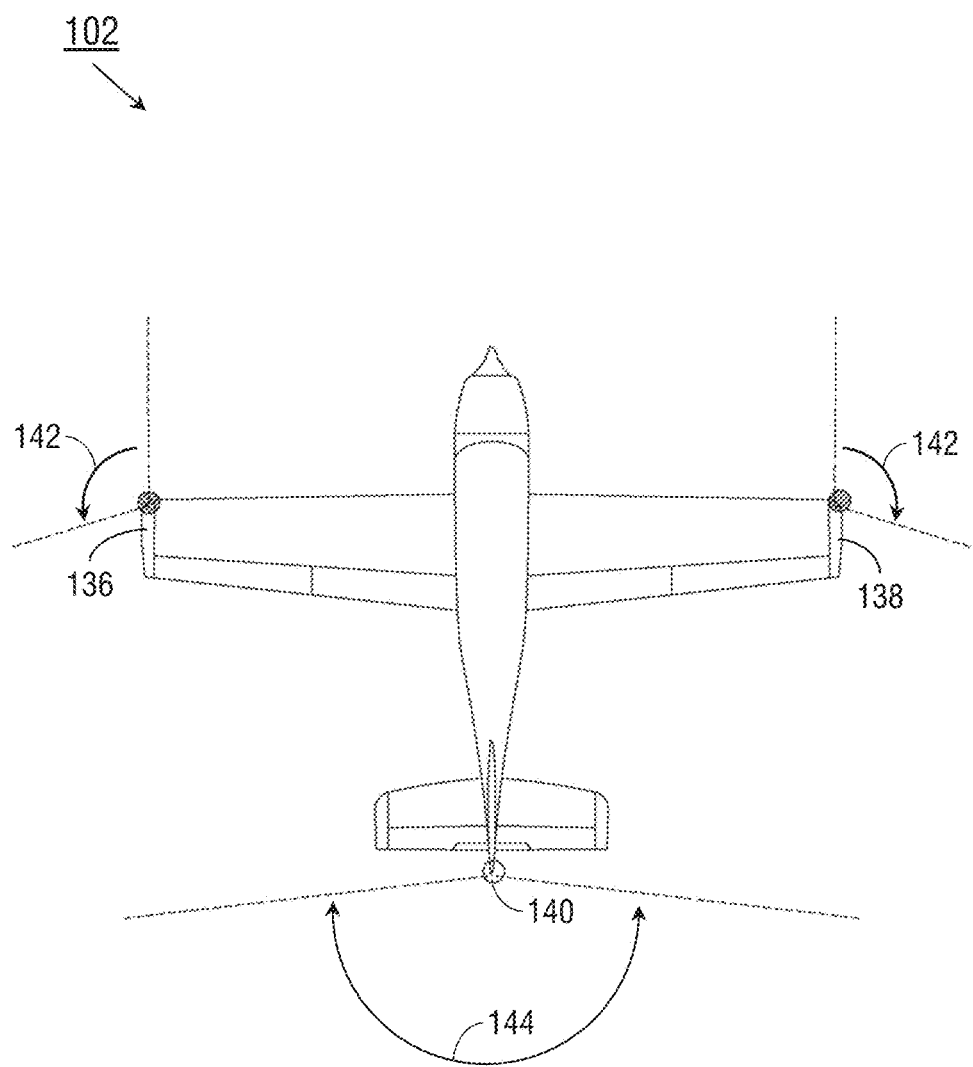
FIG. 6 is an overhead view of an aircraft configured for installation of the transceiver device of FIG. 4.
Figure 7A:
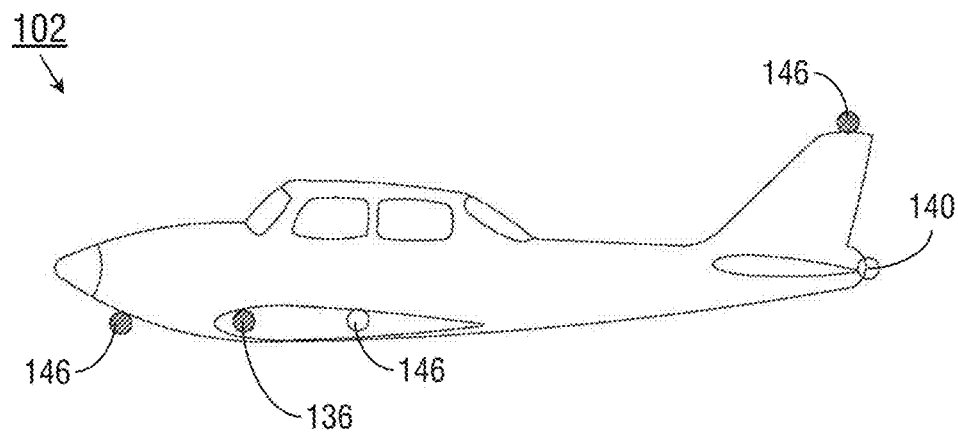
FIGS. 7A and 7B are respectively port-side and underside views of the aircraft of FIG. 6.
Figure 7B:
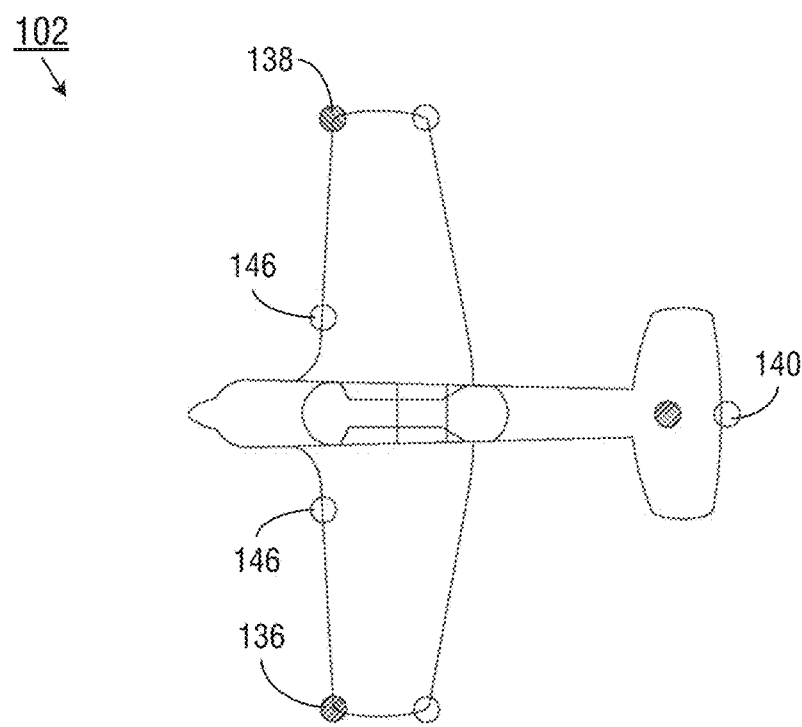
Figure 7C:
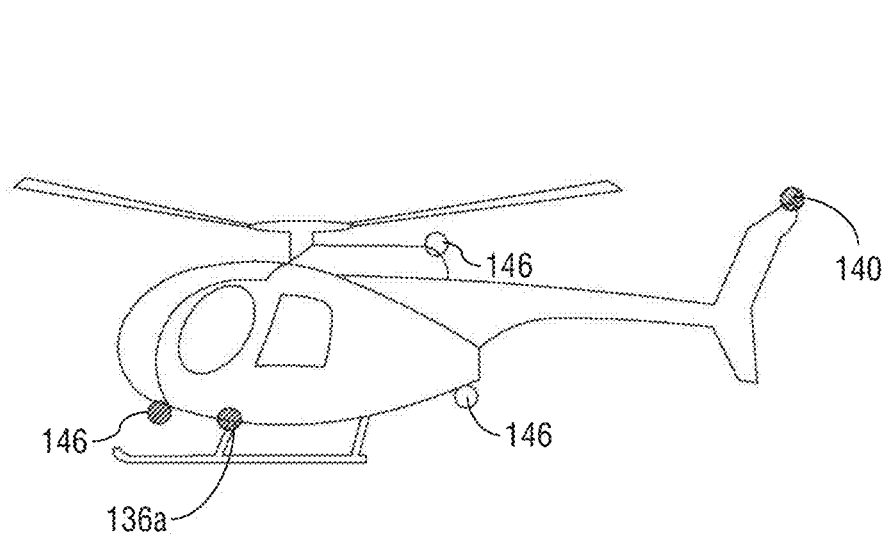
FIGS. 7C and 7D are respectively port-side and overhead views of a helicopter configured for installation of the transceiver device of FIG. 4.
Figure 7D:
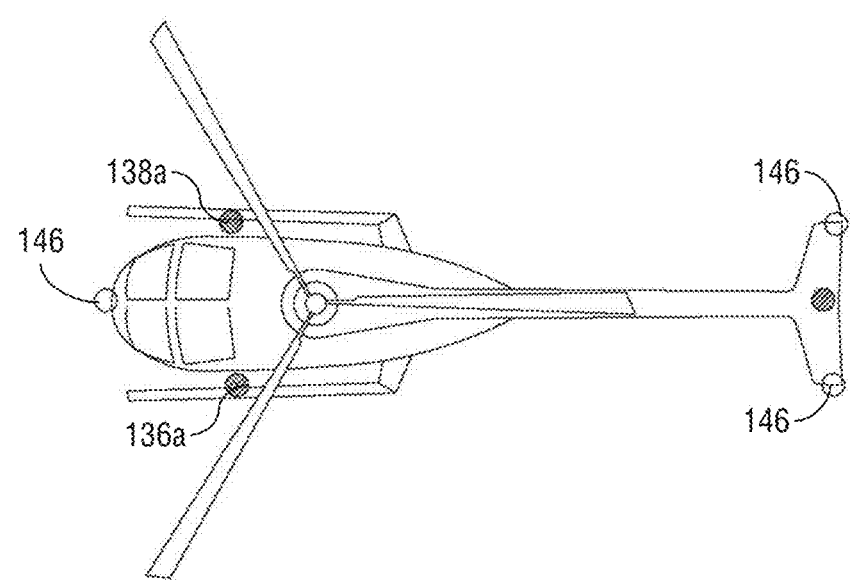

Referring to FIG. 6, the aircraft 102 may include a port wing-mounted navigation light assembly 136, a starboard wing-mounted navigation light assembly 138, and an aft/rear navigation light assembly 140. For example, aviation navigation lights may be mounted in a similar fashion to marine navigation lights, so that the relative position of the aircraft 102 may be determined at a glance by anyone within visual range, even in darkness or degraded visual environments (DVE). The port wing-mounted navigation light assembly 136 may include a red light (a strobe and/or white position light may also be included), the starboard wing-mounted navigation light assembly 138 may include a green light (a strobe and/or white position light may also be included). In other embodiments an aft navigation light ADS-B light assembly 140 may include white or strobe lighting elements. Accordingly, a proximate aircraft or observer may determine at a glance, based on the configuration of green, red, and white lights, whether the aircraft 102 is facing toward or away from the observer, or is showing its port or starboard side. The port and starboard wing-mounted navigation lights 136, 138 may be visible within a first prescribed arc 142 (e.g., dead ahead to two points abaft, or 112.5 degrees) and the aft navigation lights visible within a second prescribed arc 144 (e.g., astern to two points abaft on either side, or 135 degrees).

Referring also to FIGS. 7A through 7D, the system 100 of FIG. 4 may be implemented aboard an aircraft 102 or a helicopter 102*a* in port or starboard wing-mounted navigation light assemblies 136, 138 or aft/rear navigation light assemblies 140, port or starboard navigation light assemblies 136*a*, 138*a* aboard the helicopter 102*a*, or in other light housings (146) mounted around the fuselage of the aircraft 102 or helicopter 102*a* (e.g., wing lights, logo lights, landing lights, anti-collision lights, nose-mounted lights, skid-mounted lights).

Figure 8A:
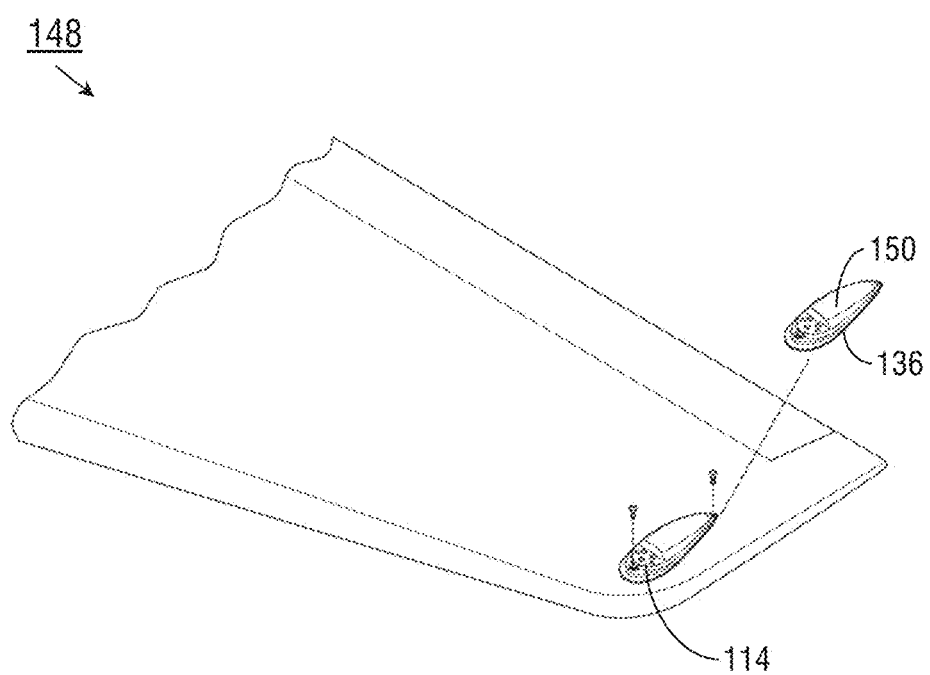
FIGS. 8A through 8C are illustrations of a wing-mountable navigation lighting assembly configured for installation of the transceiver device of FIG. 4.
Figure 8B:
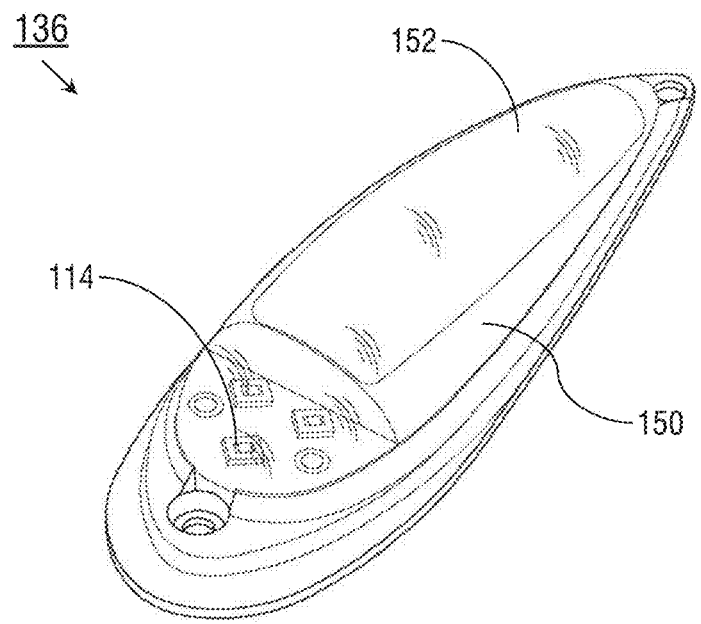
Figure 8C:
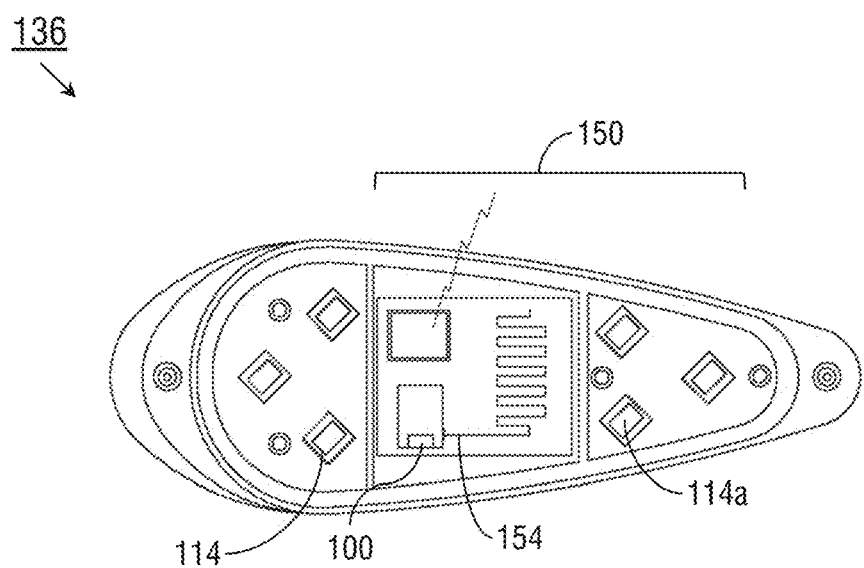

Referring to FIGS. 8A-C, the port wing-mounted navigation light assembly 136 (or starboard wing-mounted navigation light assembly 138) may be an ideal location for installing the transceiver device 100 of FIG. 4. For example, the port wing-mounted navigation light assembly 136 may be attachable or detachable to the port wing (148) of the aircraft 102 (FIG. 4), and may be associated with a standardized design across a variety of aircraft classes. Included within the port wing-mounted navigation light assembly 136 may be the navigation lighting elements 114 as well as a compartment (150) within which the transceiver device 100 may be mounted. The compartment 150 may be covered (and shielded from the elements) by a transparent or translucent covering (152) which may additionally cover the navigation lighting elements 114. Referring in particular to FIG. 8C, the port wing-mounted navigation light assembly 136 may include secondary navigation lighting elements (114*a*), e.g., an anti-collision strobe light. The transceiver device 100 may be mounted within the port wing-mounted navigation light assembly 136 with its broadest side parallel to the wing (148, FIG. 5A) and connected to an aircraft transponder antenna (116, FIG. 4) via an antenna cable 154 coupled to the exterior cable port (132, FIG. 5A).

Figure 8D:
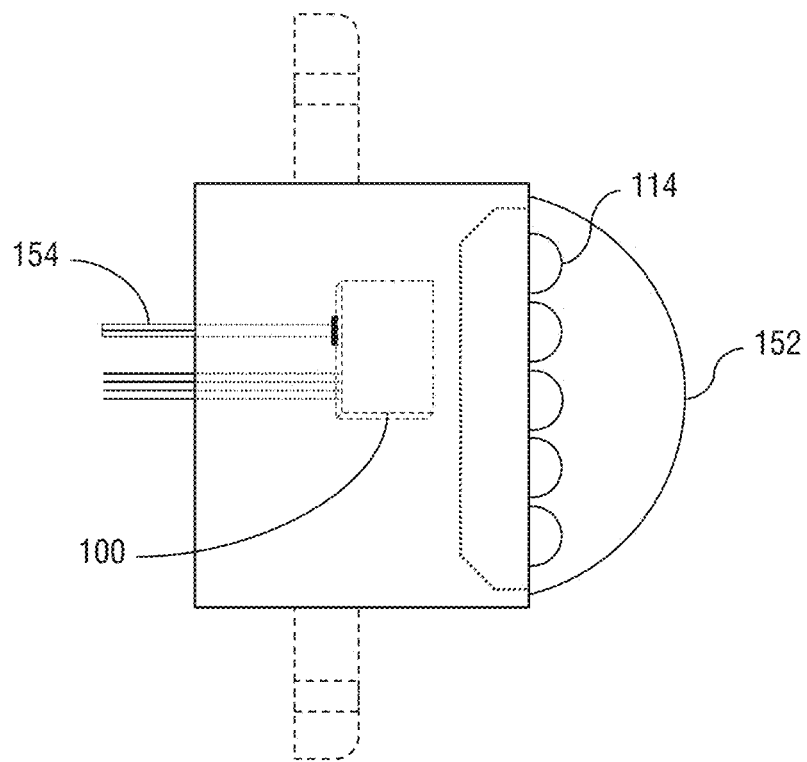
FIG. 8D is an illustration of an aft/rear navigation light assembly configured for installation of the transceiver device of FIG. 4.

Referring now to FIG. 8D, the transceiver device 100 may be mounted to an aft/rear navigation light assembly 140 instead of a port or starboard wing-mounted navigation light assembly 136, 138 as in FIGS. 8A-8D. While the design and shape of aft navigation light assemblies 140 may vary more broadly than that of wing-mounted navigation light assemblies (port 136, starboard 138), some aft navigation light assemblies may provide space for installation of the transceiver device 100.

Referring now to FIGS. 9A through 9E, the transceiver device 100*b* may be implemented and may function similarly to the transceiver device 100 of FIG. 4, except that the transceiver device 100*b* may comprise an external transponder antenna (116*a*) and a device housing enclosing a GPS/GNSS receiver or similar satellite-based navigation source (122*a*; e.g., a WAAS ADS-B qualified navigation source) and navigation lights (114). The navigation lights 114 may include light emitting diode (LED)-based lighting elements; e.g., red port-side lights or green starboard-side lights. For example, referring in particular to FIGS. 9B and 9C, the transceiver device 100*b* may be mountable to a wing (148*a*) of an aircraft (via bolt holes 156; e.g., by replacing a standard port or starboard navigation light assembly (136-138, FIG. 6) such that the GPS receiver 122*a* has an unobstructed view of the sky and the transponder antenna 116*a* remains clear of the airframe and vertically polarized. The transceiver device 100*b* may be connected to, and powered by, onboard aircraft power sources (112), allowing the transceiver device to be attached to the wing (148*a*) without any further airframe modifications or additional antennas. Similarly, to the transceiver devices 100, 100*a*, the transceiver device 100*b* may be preconfigured with aircraft-specific parameters (e.g., an ICAO address, aircraft length/width, emitter category, GPS offset) which may be included in an outbound ADS-B OUT message (120) encoded and sent (along with, e.g., the geo-referenced position determined by the GPS receiver) by the UAT transmitter 104.

In some embodiments, a single transceiver device 100*b* may be installed to provide zero-install ADS-B OUT compliance (via the UAT transmitter 104) as required by federal regulatory authorities by 2020. The transceiver device 100*b* may be mounted to either wing (148*a*) in place of a port or starboard navigation light assembly (136-138, FIG. 6). A second transceiver device 100*b*, including a transponder antenna 116*b*, UAT receiver 106*a* and Wi-Fi interface 110, may be mounted to the opposing wing to provide ADS-B IN connectivity above and beyond the required ADS-B OUT services (in addition to navigational lighting. For example, inbound ADS-B IN messages (126; e.g., craft-to-craft ADS-B OUT messages, TIS-B messages, FIS-B messages, and ADS-R messages) may be received and decoded by the UAT receiver 106*a* and transmitted (via the Wi-Fi interface 110) to EFIS 128 aboard the aircraft. Referring in particular to FIG. 9D, the transceiver device 100*c* may be implemented and may function similarly to the transceiver device 100*b* of FIGS. 9A-C, except that the transceiver device 100*c* may include secondary navigation lights 114*a* and/or aft-oriented or laterally-oriented anti-collision or strobe lights (114*b*).

Figure 9A:
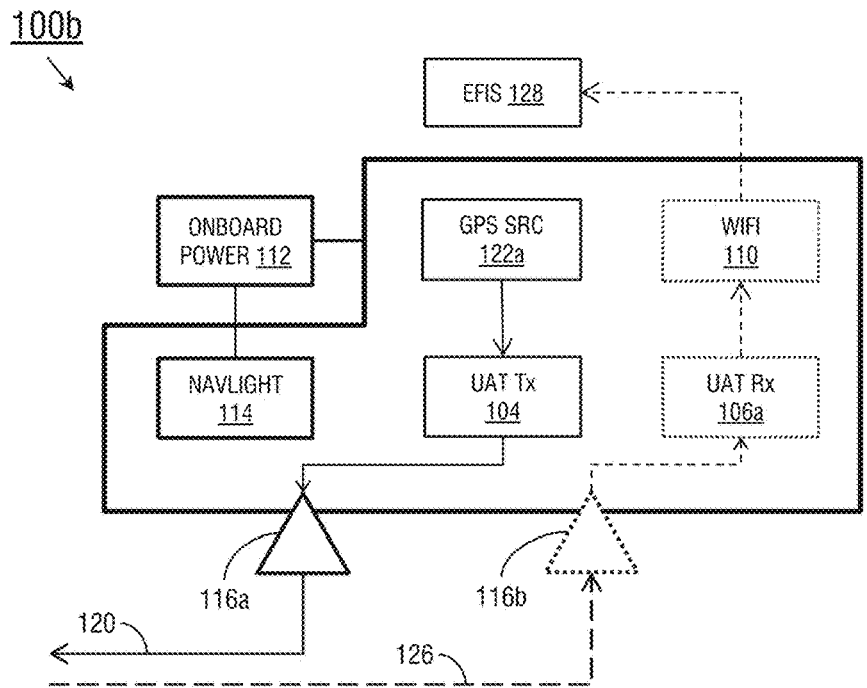
Figure 9B:
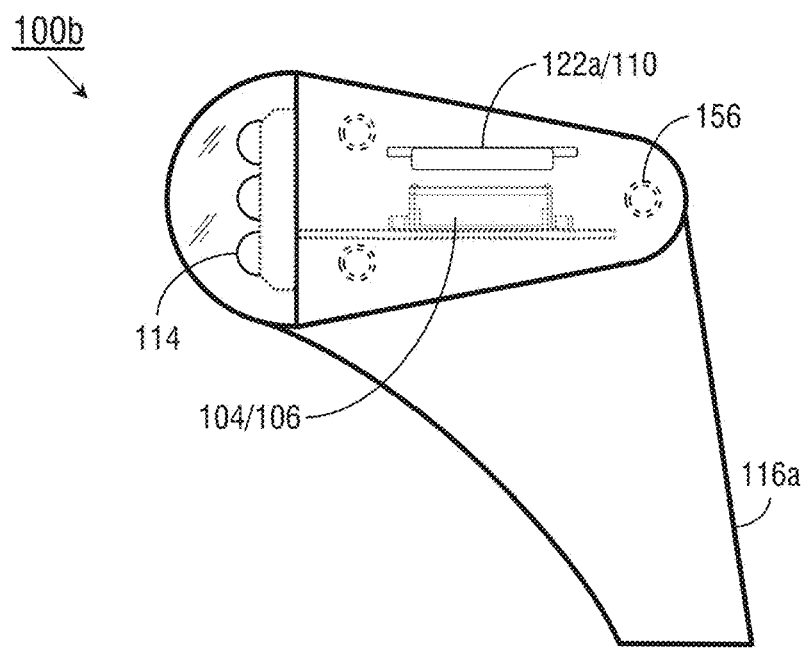
Figure 9D:
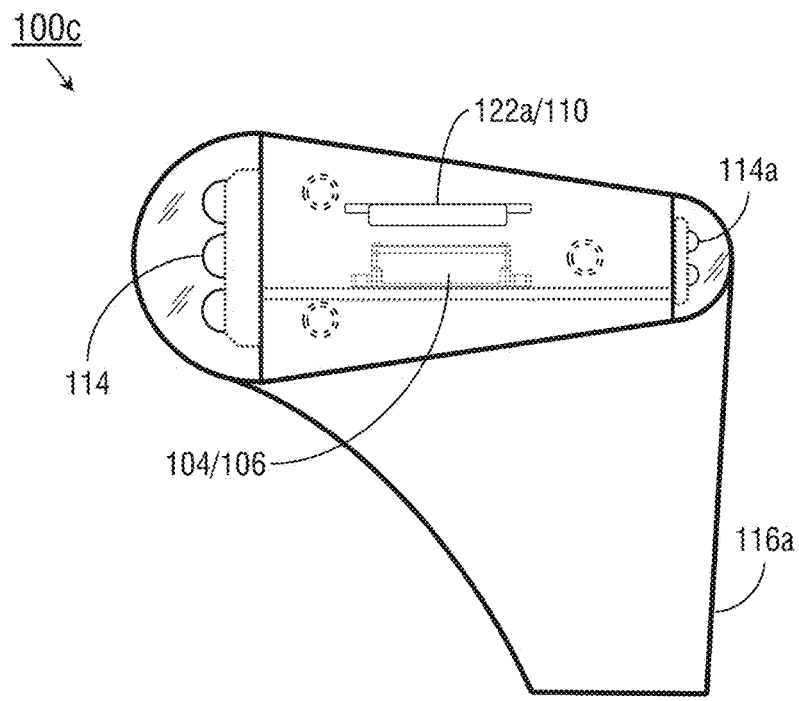
Figure 9E:
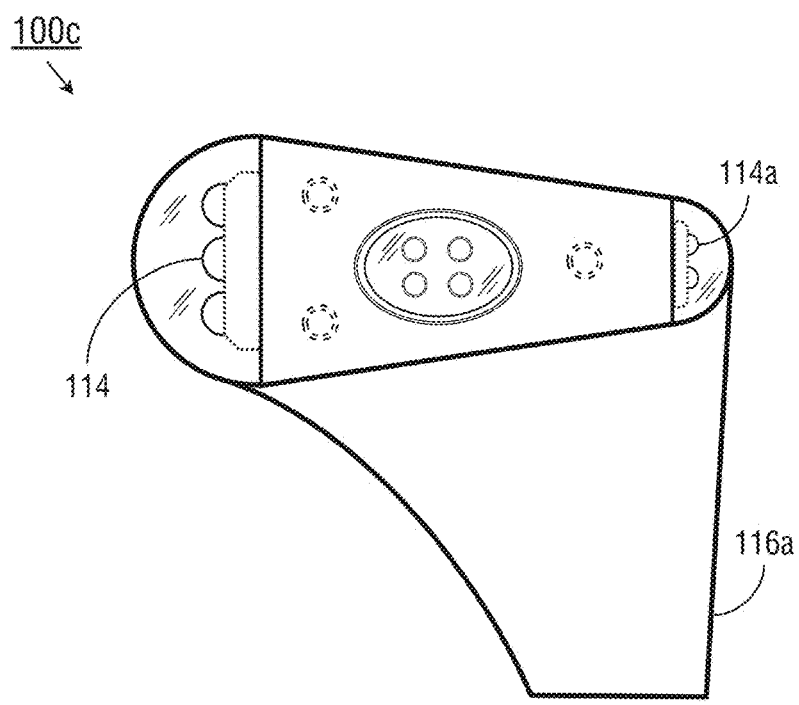

Referring now to FIGS. 10A and 10B, the transceiver device 100*d* may be implemented and may function similarly to the transceiver device 100*b* of FIG. 9B, except that the transceiver device 100*d* may not incorporate navigation lighting. For example, the transceiver device 100*d* may be mountable to either wing of the aircraft (via bolt holes 156 and bolts 156*a*) via the device housing 158. The UAT transceiver 104, dual-mode receiver 106, transponder monitor 108, wireless interface 110, GPS source 124 processors 124, memory 124*a* (FIG. 4) and GPS source 122 may be incorporated within the device housing 158 and connected to the transponder antenna 116*a* via an interior antenna cable 154. The transceiver device 100*d* may be connected, through the device housing 158, to existing aircraft wiring and circuit breakers, eliminating the need for a supplemental power source.

Figure 11:
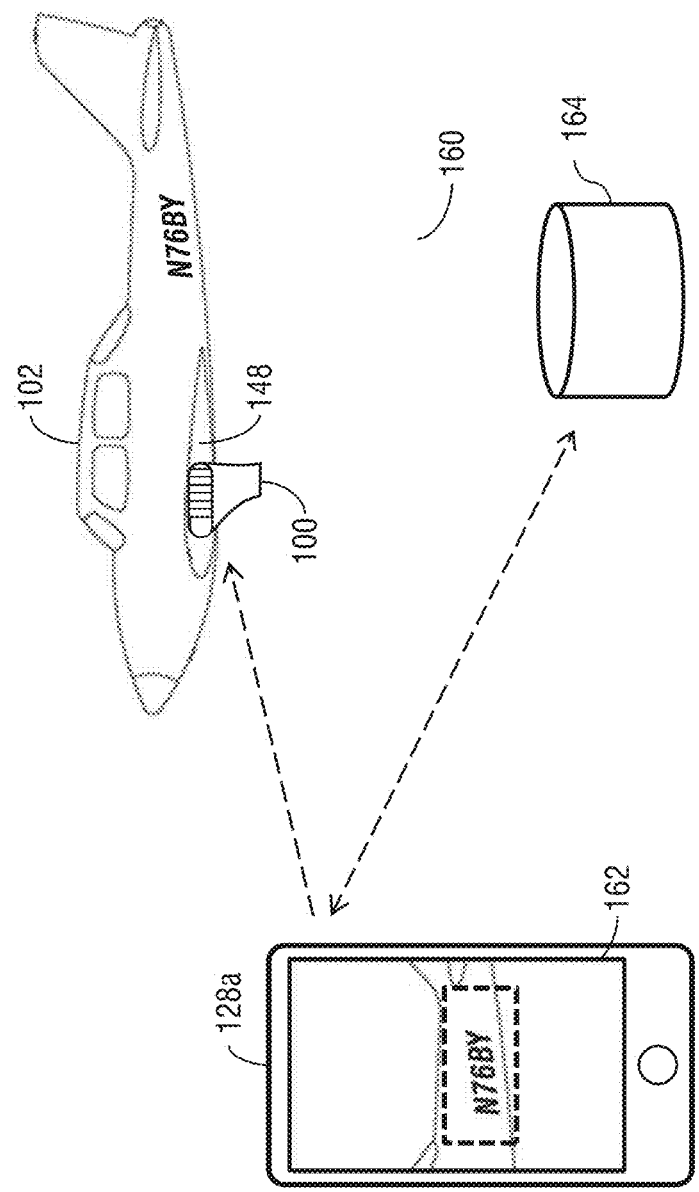
FIG. 11 illustrates configuration operations of the wing-mountable transceiver devices of FIG. 4 and FIGS. 9A-9E.

Referring now to FIG. 11, the transceiver device 100 may be configured for operation once installed to the wing 148 of the aircraft 102. Insufficient or improper configuration of ADS-B compatible avionics is a contributing factor to non-performing ADS-B equipment among general aviation craft. For example, each aircraft 102 may be associated with a unique 24-bit International Civil Aviation Organization (ICAO) address, of which $2^{24}-1$ or about 16.8 million possible addresses exist; the 24 bits correspond to 8-digit decimal or octal strings and 6-digit hexadecimal strings, each of which corresponds to a single aircraft. ICAO addresses were originally associated with 1090 MHz transponder equipment, but now more generally correspond to specific aircraft based on the registration number (e.g., N-number in the United States). ADS-B avionics may be installed and activated aboard aircraft without being configured to the proper ICAO address; consequently, the aircraft may instead broadcast a default code, e.g., 000000, 123456, or ABCDEF. If more than one aircraft in a particular airspace broadcasts the same default code, the aircraft cannot be distinguished from one another. Similarly, ADS-B avionics may include automated functionality to determine (based, e.g., on the onboard WAAS GPS source feeding ADS-B OUT position messages) whether the aircraft is airborne or on the ground. If the avionics are improperly configured, the aircraft may be on the ground (e.g., at an airport) but transmit airborne data, complicating the management of air and ground traffic at the airport. Further, emitter category settings may be improperly configured, leading "light" category aircraft (e.g., <15,500 lb) to transmit as "small" aircraft (15,500 to 50,000 lb).

The transceiver device 100 may auto-configure once the device has been mounted to the wing 148 and activated. For example, the transceiver device 100 may be associated with one or more applications configured to execute on a smartphone 128*a*, tablet, or like EFIS mobile device (128, FIG. 4). For instance, the smartphone 128*a* may, via said applications, be connected (via the wireless interface 110, FIG. 4) to the transceiver processors (124, FIG. 4) to establish communication between the smartphone 128*a* and the transceiver device 100. In operation, the smartphone app connects to the database to retrieve the data, and then transmits that data via the wireless interface 110. The smartphone 128a may connect (via the wireless interface 110) to a remote registration databases and retrieve registration data specific to the aircraft 102, populating the memory (124a, FIG. 4) with the retrieved registration data, e.g., the ICAO address assigned to the aircraft by the registration authority. Additionally, the smartphone (128a, FIG. 4) may connect (via the wireless interface 110, FIG. 4) to an additional database to determine the length and width of the aircraft, the emitter category of the aircraft (e.g., light, small, large, large with high vortex, heavy, highly maneuverable), a GPS antenna offset position, a default VFR squawk code (e.g., 1200 in the United States), an emergency notification associated with the squawk code, the ADS-B IN capability of the aircraft (e.g., none (ADS-B OUT only), UAT/978 MHz, ES/1090 MHz, or combined 978/1090), and the VSO speed of the aircraft (which may allow the transceiver device 100 to switch automatically between airborne and ground-based operating modes) on the smartphone 128a application. Aircraft registration data may be tied to the unique registration number 160 of the aircraft 102 (which may additionally serve as a radio callsign for general-aviation craft); e.g., N76BY. The transceiver device 100 may be associated with one or more applications configured to execute on a smartphone 128a, tablet, or like EFIS mobile device (128, FIG. 4) and receive inbound flight data from the transceiver device 100 (based on received and decoded ADS-B IN messages). The smartphone 128a may, via said applications, be configured to capture an image (162) of the aircraft 102 (e.g., by directing the pilot to do so during a configuration stage) including the tail number 160 and identify, via processing of the image 162 (e.g., optical character recognition), the tail number to a sufficient confidence level. Once the tail number 160 has been identified by the smartphone 128a, the configuration data corresponding to the tail number may be retrieved automatically from registration databases (164) which the FAA (in part) makes available, and transmitted to the memory 124a for use by the transceiver device 100.

Figures 12A, 12B, 12C:
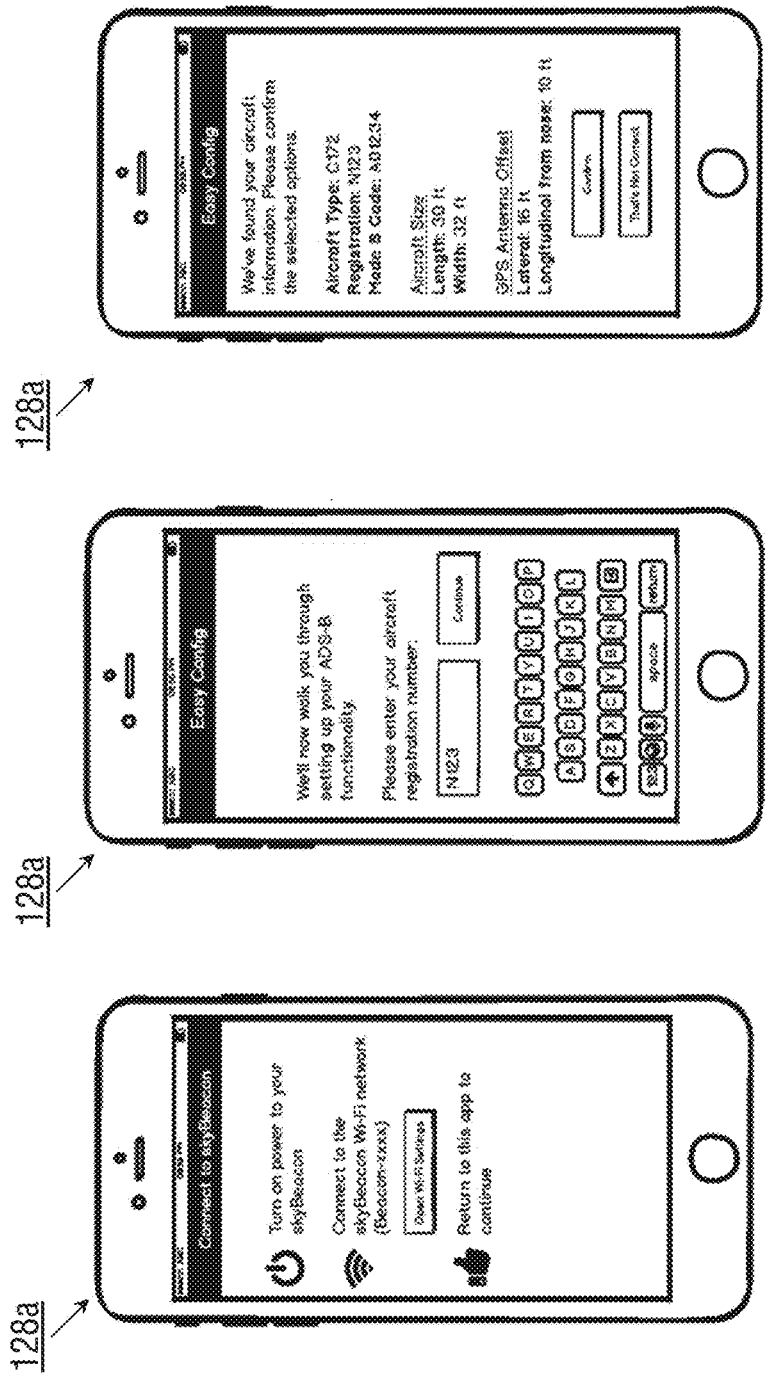
FIGS. 12A through 12C illustrate configuration screens of the wing-mountable transceiver devices of FIGS. 1-3.

Referring now to FIGS. 12A-C, the transceiver device 100 may be automatically or manually configurable via a smartphone 128a, tablet, or like EFIS mobile device. As noted above, pilots and owners (especially those of smaller, hobby-grade aircraft and personal aircraft) may upgrade their onboard equipment or install new equipment to comply with regulations mandating participation in the next-generation ADS-B surveillance and traffic control system. However, if this new or upgraded equipment is improperly or insufficiently configured, the aircraft may be associated with what may generally be called a "nonperforming emitter"—an unconfigured or misconfigured ADS-B implementation that introduces incomplete or inaccurate information into the system at large. For example, ADS-B equipment may not be configured to the proper ICAO address corresponding to a particular aircraft, leading the aircraft to broadcast a default code (e.g., 000000, 123456) that may render it indistinguishable from other such aircraft. Similarly, if the aircraft has a Mode-S transponder which broadcasts an ICAO (either an accurate ICAO address or a default as described above), and an ADS-B installation is broadcasting an ICAO address different from that broadcast by the transponder, air traffic control facilities may mistakenly interpret an imminent collision between two aircraft sharing the same airspace. Furthermore, the ADS-B system may not be configured to correctly indicate whether the aircraft is airborne or on the ground. The ADS-B system may not be configured to indicate the proper emitter category, size envelope (e.g., width/height), or GPS antenna offsets. Any or all of these factors may combine to frustrate the purpose of the ADS-B system by obscuring the ability of onboard ADS-B systems, in cooperation with traffic control, to provide an accurate and dynamic portrait of air and ground traffic.

For example, referring in particular to FIG. 12A, upon installation of the transceiver device 100 and connection to the aircraft power line (230, FIG. 1), applications configured to execute on the smartphone 128a may initiate a snap configuration, or automatic initial configuration, by directing the user/owner/pilot to power the transceiver device 100. The user may then connect the smartphone 128a to a wireless network using the transceiver device 100 as a wireless access point (e.g., the transceiver device 100 will automatically attempt to establish a predetermined wireless connection corresponding to a unique SSID readable by the smartphone). Once the smartphone 128a is successfully wirelessly connected to the transceiver device 100, the user may enter the registration number corresponding to the aircraft to which the transceiver device has been installed. For example, the user may manually enter the registration number (referring in particular to FIG. 12B) or acquire the registration number by photographing the aircraft (as shown by FIG. 11). Referring in particular to FIG. 12C, the registration number may be cross-referenced with several remote databases (164, FIG. 11), e.g., FAA aircraft registration data corresponding to the submitted registration number, e.g., the corresponding aircraft type and ICAO address. Additional remote databases may supply aircraft model and manufacturer information as well as aircraft-specific parameters such as the size envelope within which the aircraft fits (corresponding to an approximate length and width), the GPS antenna offsets (e.g., lateral relative to the roll axis and longitudinal aft from the nose), and minimum/stall speed (e.g., $V_{SO}$; for determining whether the aircraft is airborne). The user may be provided an opportunity to confirm the accuracy of the retrieved configuration data or correct any known discrepancies (e.g., forwarding any corrections back to the remote databases) before completing the initial configuration process; configuration data confirmed to be correct may be stored to memory for use by ADS-B communications.

Figures 13A, 13B:
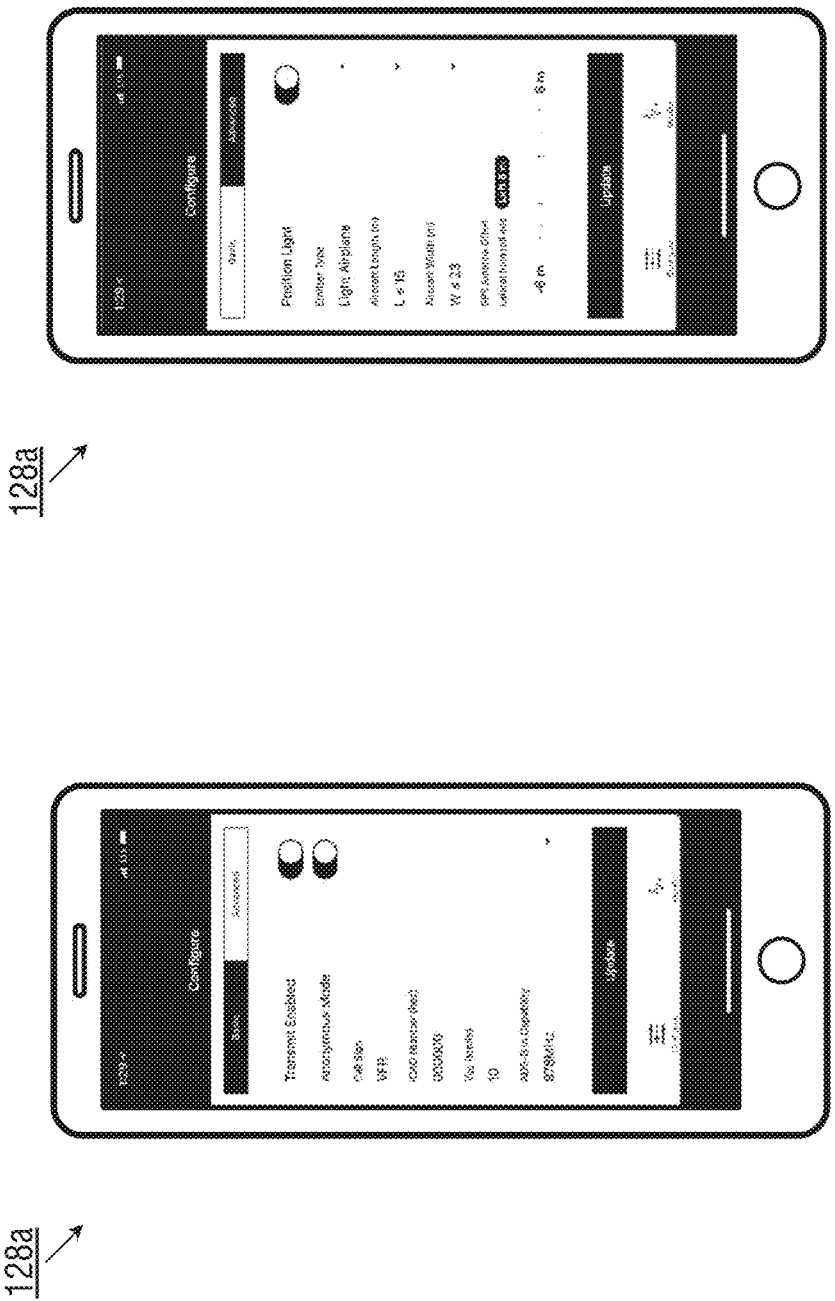
FIGS. 13A and 13B illustrate configuration screens of the wing-mountable transceiver devices of FIGS. 1-3.

Referring also to FIGS. 13A and 13B, the smartphone 128a may provide the user with additional opportunities (e.g., subsequent to the snap/initial configuration process) to manually check, correct, or add configuration data (while on the ground) used by the transceiver device 100 for ADS-B communication. For example, referring to FIG. 13A, basic configuration data may include not only the ICAO address and $V_{SO}$ speed but the VFR call sign (which may be equivalent to the tail number). The user may manually enable/disable transmit capability for the transceiver device 100 (e.g., via the UAT (240, FIG. 3A)) or broadcast in anonymous mode (e.g., via a self-assigned temporary ICAO address and random VFR call sign). The user may further specify the type of ADS-B IN capability (e.g., for receipt of FIS-B, TIS-B, and ADS-R messaging), depending on the aircraft equipment configuration. For example, the level of ADS-B IN functionality may be indicated by: no such functionality, 1090 MHz ES, 978 MHz UAT, or combined 978/1090. Referring in particular to FIG. 13B, the user may select advanced configuration data to enable the navigation lights (218A-B, 220; FIG. 1) (e.g., port-side red lights, starboard-side green lights, aft or dorsal white lights or strobes) or check/correct the emitter category, aircraft length and width, and GPS antenna offsets corresponding to the aircraft model, as described above.

Figure 14B:
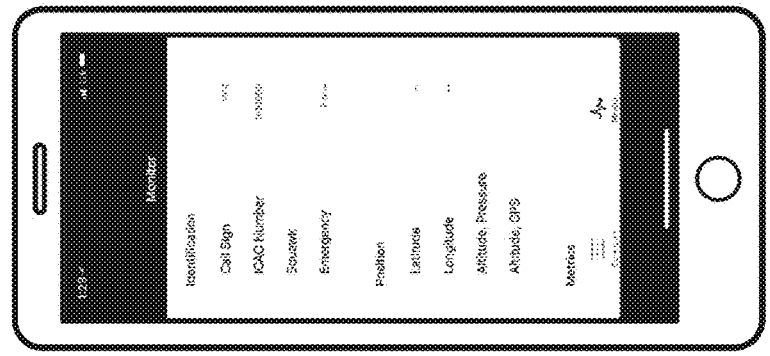
FIGS. 14A and 14B illustrate monitoring screens of the wing-mountable transceiver devices of FIGS. 1-3.
Figure 14A:
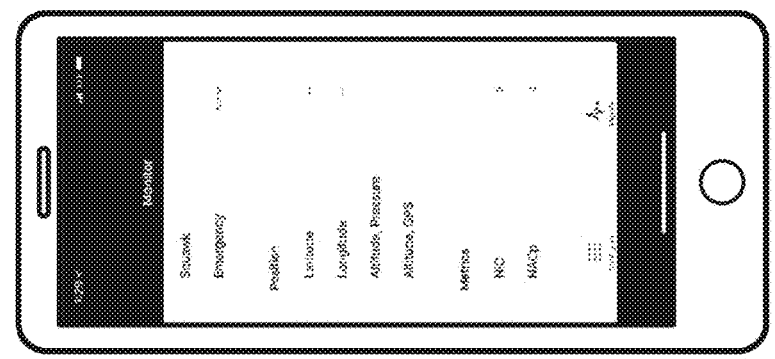

Referring now to FIGS. 14A and 14B, monitoring screens of the smartphone 128a for monitoring the transceiver device 100 of FIGS. 1 through 3 are shown. For example, the smartphone 128a, via wireless link established with the transceiver device 100 (e.g., via the wireless interface 110), may monitor configuration and operating data currently in use by the transceiver device 100 (e.g., as a pre-flight check to ensure proper configuration of parameters and unit operation). As noted above, this configuration data may be manually entered by the operator via the smartphone 128a, retrieved from remote databases (164, FIG. 11) during the initial configuration process, or extracted from the aircraft power line (230, FIG. 1) based on noise signals (e.g., parasitic oscillation, current pulse) induced by the transmission of reply signals (226, FIG. 1) by the transponder (224, FIG. 1). For example, the call sign and ICAO address may be retrieved based on the (manually entered or photographed) registration number; the squawk code and pressure altitude may be extracted from the aircraft power line; and absolute position and positioning metrics (e.g., NIC, NACp) may be updated by the GPS/GNSS positioning subsystem of the transceiver device 100.

Turning now to FIG. 15, an induced power line communication system 500 may provide inter-device communication via parasitic oscillations 228 (e.g., induced signals, induced pulses, current pulses) over an aircraft 300 electrical system 400. In an embodiment of such a system 500, between replaceable navigation light assemblies (218A, 218B, 220) with various features and the like (e.g., ADS-B IN) between components (e.g., a transceiver device 10A on the port wing and a transceiver device 10B on the starboard wing, an EFIS device 128 carried onboard the aircraft) or to ground-based control facilities. In another embodiment, ownship radar digital transponders and the like may be tuned to, or configured for, intentionally inducing parasitic oscillations including data including, for example, squawk/altitude/IDENT. A similar receive circuit may also be included. In yet another embodiment a transponder monitor adapter (e.g. USB, ARINC or the like connected adapter) may also be provided to add communication features between legacy aircraft electrically powered devices. A direct attached embodiment, such as a serial-to-digital transponder with a power line interface may allow utilization with Mode-S transponder.

Regardless of transponder interface, the present invention (10, 10A, 10B, 100, and 500) ability to provide Transponder Autonomous Integrity Monitoring (TAIM) in, preferably the transceiver processors (124, 250) (e.g. to report an altitude divergence, communication failure, or improper setup (i.e., a non-performing emitter)). In such an embodiment, the ADS-B broadcast could reflect the error to ATC (through callsign updates or auto-squawking radio failure codes, or the like). Such an embodiment may also provide pilot annunciation (Wi-Fi, LED, and the like). Flashing one or more position lights or the like may annunciate mis-configuration or self-test failures and the like.

The invention claimed is:

1. An Automatic Dependent Surveillance-Broadcast (ADS-B) compliant transmitter vehicle replacement light, said compliant transmitter electrically powered by an installed vehicle electrical system, said compliant transmitter not including: (i) either a pneumatic or electrical connection to a barometric pressure sensing device, (ii) a squawk code user interface system, (iii) an antenna and receiver for receiving a radar transponder output signal, and (iv) a wired signal connection to an output signal of a radar transponder, said compliant transmitter comprising:
   (a) a vehicle replacement light, said vehicle replacement light having a size and shape at least partially conforming to a vehicle light to be replaced, said vehicle replacement light consisting essentially of:
      (1) a pair of electrical connections for electrically connecting said vehicle light to the installed vehicle electrical system, said electrical connection pair including a power wire and a ground connection;
      (2) at least one of a white, red, and green light emitting device electrically connected to said pair of electrical connections;
      (3) an ADS-B transmitter for transmitting ADS-B signals on at least one of 978 MHz Universal Access Transceiver (UAT) and 1090 MHz Extended Squitter (ES); and
      (4) a processor operatively coupled to said ADS-B transmitter and said electrical connections, wherein the processor is configured to reconstruct one or more data based on an induced signal on at least the power wire of said pair of electrical connections; and
   (b) an antenna operably connected to and generally collocated with said vehicle replacement light, said antenna for transmitting compliant ADS-B signals from said ADS-B transmitter, said compliant ADS-B signals including at least one data from said induced signal from at least the power wire of said pair of electrical connections.

2. The ADS-B compliant transmitter vehicle replacement light of claim 1, wherein the processor includes a field-programmable gate array (FPGA).

3. The ADS-B compliant transmitter vehicle replacement light of claim 1, further comprising a radio-frequency choke.

4. The ADS-B compliant transmitter vehicle replacement light of claim 3, further comprising a band-pass filter operatively coupled to the transponder.

5. The ADS-B compliant transmitter vehicle replacement light of claim 4, further comprising a power detector operatively coupled to the band-pass filter.

6. The ADS-B compliant transmitter vehicle replacement light of claim 1, further comprising at least one data storage unit operatively coupled to the processor.

7. The ADS-B compliant transmitter vehicle replacement light of claim 1, wherein the one or more data includes at least one of an aircraft identifier, squawk code, and barometric altitude; and wherein the ADS-B signal includes at least two of the following key message bits: downlink format, capability, ICAO aircraft address, data, type code, and parity/interrogator identification; and wherein said ADS-B signal contains at least one of the following: aircraft identification, surface position, airborne position (e.g., barometric altitude), airborne velocities, airborne position (e.g., GNSS height).

8. The ADS-B compliant transmitter vehicle replacement light of claim 1, wherein the induced signal is in response to a radio-frequency interrogation received from at least one of another aircraft and a ground station.

9. The ADS-B compliant transmitter vehicle replacement light of claim 1, wherein the one or more data may include transponder reply information generated by at least one of a Mode-A transponder, a Mode-C transponder, and a Mode-S transponder.

10. An Automatic Dependent Surveillance-Broadcast (ADS-B) compliant transmitter vehicle replacement light, comprising:

a transponder configured to induce at least one parasitic oscillation on a power wire in response to at least one of a receipt of a radio-frequency interrogation and a transmission of a response signal;

a band-pass filter operatively coupled to the transponder;

a power detector operatively coupled to the band-pass filter;

an ADS-B compliant transmitter operatively coupled to the power detector; and a processor operatively coupled to a universal access transceiver and the power detector, wherein the processor is configured to receive the parasitic oscillation from the power wire;

reconstruct one or more data based on the parasitic oscillation; and transmit the one or more data to the ADS-B compliant transmitter.

11. The ADS-B compliant transmitter vehicle replacement light system of claim 10, wherein the processor includes a field-programmable gate array.

12. The ADS-B compliant transmitter vehicle replacement light system of claim 10, further comprising:

a radio-frequency choke operatively coupled to the power wire, the power wire operatively coupled with each of the transponder and the universal access transceiver, wherein the radio-frequency choke is configured to block radio-frequencies of the parasitic oscillation from the ADS-B compliant transmitter.

13. The ADS-B compliant transmitter vehicle replacement light system of claim 10, further comprising:

at least one data storage unit operatively coupled to the processor.

14. The ADS-B compliant transmitter vehicle replacement light system of claim 10, wherein the one or more data includes at least one of an aircraft identifier, squawk code, altitude, roll, track angle, ground speed, airspeed, magnetic heading, rate of climb, and rate of descent.

15. The ADS-B compliant transmitter vehicle replacement light system of claim 10, wherein the radio-frequency interrogation is received from at least one of another aircraft and a ground station.

16. The ADS-B compliant transmitter vehicle replacement light system of claim 10, wherein the transponder includes at least one of a Mode-A transponder, a Mode-C transponder, and a Mode-S transponder.

* * * * *